US010198962B2

(12) United States Patent
Postlethwaite et al.

(10) Patent No.: US 10,198,962 B2
(45) Date of Patent: Feb. 5, 2019

(54) LEARNING MANAGEMENT SYSTEM FOR A REAL-TIME SIMULATED VIRTUAL REALITY WELDING TRAINING ENVIRONMENT

(71) Applicant: Lincoln Global, Inc., City of Industy, CA (US)

(72) Inventors: Deanna Postlethwaite, Changrin Falls, OH (US); Matthew Wayne Wallace, South Windsor, CT (US); David Anthony Zboray, Trumbull, CT (US); Sarah Evans, Garrettsville, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

(21) Appl. No.: 15/228,524

(22) Filed: Aug. 4, 2016

(65) Prior Publication Data

US 2016/0343268 A1    Nov. 24, 2016

Related U.S. Application Data

(62) Division of application No. 14/190,812, filed on Feb. 26, 2014.

(Continued)

(51) Int. Cl.
*G09B 19/24* (2006.01)
*G09B 19/00* (2006.01)
(Continued)

(52) U.S. Cl.
CPC .......... *G09B 19/003* (2013.01); *G06Q 40/12* (2013.12); *G09B 5/00* (2013.01); *G09B 5/14* (2013.01); *G09B 19/24* (2013.01)

(58) Field of Classification Search
CPC .......... G09B 19/24; B23K 9/09; B23K 9/095; B23K 9/0953
(Continued)

(56) References Cited

U.S. PATENT DOCUMENTS

| 317,063 A | 5/1885 | Wittenstrom |
| 428,459 A | 5/1890 | Coffin |

(Continued)

FOREIGN PATENT DOCUMENTS

| CA | 2698078 | 9/2011 |
| CN | 1665633 | 9/2005 |

(Continued)

OTHER PUBLICATIONS

Notice of Allowance from U.S. Appl. No. 14/293,700 dated May 10, 2017.

(Continued)

*Primary Examiner* — Robert J Utama
(74) *Attorney, Agent, or Firm* — Calfee, Halter & Griswold LLP

(57) ABSTRACT

A learning management system (LMS) for tracking student progress as students learn how to weld in a real-time, simulated, virtual reality welding training environment. Systems and methods to help welding instructors and students manage the data associated with instruction and learning in a virtual reality welding environment are provided. Welding student training data generated by students while using virtual reality welding systems is stored in a centralized database. The centralized database is accessible by a user (e.g., a welding instructor) using a personal computer having a learning management software application (LMSA) installed thereon. The LMSA is configured to allow the user to access at least a portion of the student training data for one or more of viewing, analysis, grading, and reporting.

13 Claims, 19 Drawing Sheets

Related U.S. Application Data

(60) Provisional application No. 61/876,352, filed on Sep. 11, 2013.

(51) Int. Cl.
*G09B 5/00* (2006.01)
*G06Q 40/00* (2012.01)
*G09B 5/14* (2006.01)

(58) Field of Classification Search
USPC .............................................. 434/234, 219
See application file for complete search history.

(56) References Cited

U.S. PATENT DOCUMENTS

| | | |
|---|---|---|
| 483,428 A | 9/1892 | Goppin |
| 1,159,119 A | 11/1915 | Springer |
| 1,286,529 A | 12/1918 | Cave |
| 2,326,944 A | 8/1943 | Holand et al. |
| 2,333,192 A | 11/1943 | Mobert |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abidgaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | McPherson et al. |
| 3,654,421 A | 4/1972 | Streetman et al. |
| 3,690,020 A | 9/1972 | McBratnie |
| 3,739,140 A | 6/1973 | Rotilio |
| 3,852,917 A | 12/1974 | McKown |
| 3,866,011 A | 2/1975 | Cole |
| 3,867,769 A | 2/1975 | Schow et al. |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,354,087 A | 10/1982 | Osterlitz |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Traadt |
| 4,452,589 A | 6/1984 | Denison |
| D275,292 S | 8/1984 | Bouman |
| D277,761 S | 2/1985 | Korovin et al. |
| 4,525,619 A | 6/1985 | Ide et al. |
| D280,329 S | 8/1985 | Bouman |
| 4,555,614 A | 11/1985 | Morris et al. |
| 4,611,111 A | 9/1986 | Baheti et al. |
| 4,616,326 A | 10/1986 | Meier et al. |
| 4,629,860 A | 12/1986 | Lindborn |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,812,614 A | 3/1989 | Wang et al. |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,973,814 A | 11/1990 | Kojima |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,283,418 A | 2/1994 | Bellows et al. |
| 5,285,916 A | 2/1994 | Ross |
| 5,288,968 A | 2/1994 | Cecil |
| 5,294,229 A * | 3/1994 | Hartzell ............... H04M 11/066 434/322 |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| 5,465,037 A | 11/1995 | Huissoon et al. |
| D365,583 S | 12/1995 | Viken |
| 5,493,093 A | 2/1996 | Cecil |
| 5,547,052 A | 8/1996 | Latshaw |
| 5,562,843 A | 10/1996 | Yasumoto |
| 5,662,822 A | 9/1997 | Tada et al. |
| 5,670,071 A | 9/1997 | Tomoyuki et al. |
| 5,676,503 A | 10/1997 | Lang |
| 5,676,867 A | 10/1997 | Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degan et al. |
| 5,728,991 A | 3/1998 | Takada et al. |
| 5,751,258 A | 5/1998 | Fergason et al. |
| D395,296 S | 6/1998 | Kaya et al. |
| 5,774,110 A | 6/1998 | Edelson |
| D396,238 S | 7/1998 | Schmitt |
| 5,781,258 A | 7/1998 | Debral et al. |
| 5,823,785 A | 10/1998 | Matherne |
| 5,835,077 A | 11/1998 | Dao et al. |
| 5,835,277 A | 11/1998 | Hegg |
| 5,845,053 A | 12/1998 | Watanabe et al. |
| 5,877,777 A | 3/1999 | Colwell |
| 5,963,891 A | 10/1999 | Walker et al. |
| 6,008,470 A | 12/1999 | Zhang et al. |
| 6,037,948 A | 3/2000 | Liepa |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama et al. |
| 6,301,763 B1 | 10/2001 | Pryor |
| 6,330,938 B1 | 12/2001 | Herve et al. |
| 6,330,966 B1 | 12/2001 | Eissfeller |
| 6,331,848 B1 | 12/2001 | Stove et al. |
| 6,347,942 B1 * | 2/2002 | Blyth .................... G06Q 99/00 434/107 |
| D456,428 S | 4/2002 | Aronson et al. |
| 6,373,465 B2 | 4/2002 | Jolly et al. |
| 6,377,011 B1 | 4/2002 | Ben-Ur |
| D456,828 S | 5/2002 | Aronson et al. |
| 6,396,232 B2 | 5/2002 | Haanpaa et al. |
| D461,383 S | 8/2002 | Blackburn |
| 6,427,352 B1 | 8/2002 | Pfeiffer et al. |
| 6,441,342 B1 | 8/2002 | Hsu |

(56) References Cited

U.S. PATENT DOCUMENTS

| | | |
|---|---|---|
| 6,445,964 B1 | 9/2002 | White et al. |
| 6,492,618 B1 | 12/2002 | Flood et al. |
| 6,506,997 B2 | 1/2003 | Matsuyama |
| 6,552,303 B1 | 4/2003 | Blankenship et al. |
| 6,554,618 B1* | 4/2003 | Lockwood ............... G09B 7/00 434/118 |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,593,540 B1 | 7/2003 | Baker |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 | 11/2003 | Madill |
| 6,649,858 B2 | 11/2003 | Wakeman |
| 6,655,645 B1 | 12/2003 | Lu et al. |
| 6,660,965 B2 | 12/2003 | Simpson |
| 6,679,702 B1 | 1/2004 | Rau |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,835 B1 | 3/2004 | Lemelson |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,765,584 B1 | 7/2004 | Matthias |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,533 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 6,982,700 B2 | 1/2006 | Rosenberg et al. |
| 7,021,937 B2 | 4/2006 | Simpson et al. |
| 7,024,342 B1 | 4/2006 | Waite |
| 7,110,859 B2 | 9/2006 | Shibata et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey |
| 7,233,837 B2 | 6/2007 | Swain et al. |
| 7,247,814 B2 | 7/2007 | Ott |
| D555,446 S | 11/2007 | Picaza Ibarrondo |
| 7,298,535 B2 | 11/2007 | Kuutti |
| 7,315,241 B1 | 1/2008 | Daily et al. |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,474,760 B2 | 1/2009 | Hertzman et al. |
| 7,478,108 B2 | 1/2009 | Townsend et al. |
| 7,487,018 B2 | 2/2009 | Afshar et al. |
| D587,975 S | 3/2009 | Aronson et al. |
| 7,516,022 B2 | 4/2009 | Lee et al. |
| 7,580,821 B2 | 8/2009 | Schirm |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bollick et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,301,286 B2 | 10/2012 | Babu |
| 8,316,462 B2 | 11/2012 | Becker et al. |
| 8,363,048 B2 | 1/2013 | Gering |
| 8,365,603 B2 | 2/2013 | Lesage et al. |
| 8,465,288 B1* | 6/2013 | Roers ....................... G09B 7/08 434/118 |
| 8,512,043 B2 | 8/2013 | Choquet |
| 8,569,646 B2 | 10/2013 | Daniel et al. |
| 8,592,723 B2 | 11/2013 | Davidson et al. |
| 8,657,605 B2 | 2/2014 | Wallace et al. |
| 8,692,157 B2 | 4/2014 | Daniel et al. |
| 8,747,116 B2 | 6/2014 | Zboray et al. |
| 8,777,629 B2 | 7/2014 | Kreindl et al. |
| 8,787,051 B2 | 7/2014 | Chang et al. |
| 8,834,168 B2 | 9/2014 | Peters et al. |
| 8,851,896 B2 | 10/2014 | Wallace et al. |
| 8,911,237 B2 | 12/2014 | Postlethwaite et al. |
| 8,915,740 B2 | 12/2014 | Zboray et al. |
| RE45,398 E | 3/2015 | Wallace |
| 8,992,226 B1 | 3/2015 | Leach et al. |
| 9,011,154 B2 | 4/2015 | Kinding et al. |
| 9,293,056 B2 | 3/2016 | Zboray |
| 9,293,057 B2 | 3/2016 | Zboray |
| 9,710,980 B1* | 7/2017 | Alzahrani ........... G07C 9/00158 |
| 9,733,333 B2* | 8/2017 | Gottlieb ................. G01S 3/802 |
| 9,779,635 B2 | 10/2017 | Zboray et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0046999 A1 | 4/2002 | Veikkolainen et al. |
| 2002/0050984 A1 | 5/2002 | Roberts |
| 2002/0054211 A1 | 5/2002 | Edelson et al. |
| 2002/0085843 A1 | 7/2002 | Mann |
| 2002/0094026 A1 | 7/2002 | Edelson |
| 2002/0111557 A1 | 8/2002 | Madill et al. |
| 2002/0135695 A1 | 9/2002 | Edelson et al. |
| 2002/0175897 A1 | 11/2002 | Pelosi |
| 2002/0180761 A1 | 12/2002 | Edelson |
| 2003/0000931 A1 | 1/2003 | Ueda et al. |
| 2003/0002740 A1 | 1/2003 | Melikian |
| 2003/0017442 A1* | 1/2003 | Tudor ....................... G09B 7/04 434/322 |
| 2003/0023592 A1 | 1/2003 | Modica et al. |
| 2003/0025884 A1 | 2/2003 | Hamana et al. |
| 2003/0069866 A1 | 4/2003 | Ohno |
| 2003/0075534 A1 | 4/2003 | Okamoto |
| 2003/0106787 A1 | 6/2003 | Santilli |
| 2003/0113697 A1* | 6/2003 | Plescia ................. G06Q 10/06 434/322 |
| 2003/0111451 A1 | 7/2003 | Blankenship et al. |
| 2003/0172032 A1 | 9/2003 | Choquet |
| 2003/0180703 A1* | 9/2003 | Yates ....................... G09B 7/00 434/353 |
| 2003/0186199 A1 | 10/2003 | McCool et al. |
| 2003/0228560 A1 | 12/2003 | Seat et al. |
| 2003/0234885 A1 | 12/2003 | Pilu |
| 2004/0009462 A1* | 1/2004 | McElwrath ............. G09B 7/00 434/350 |
| 2004/0020907 A1 | 2/2004 | Zauner et al. |
| 2004/0035990 A1 | 2/2004 | Ackeret |
| 2004/0050824 A1 | 3/2004 | Samler |
| 2004/0072130 A1* | 4/2004 | Safran, Sr. ............. G09B 7/02 434/169 |

(56) References Cited

U.S. PATENT DOCUMENTS

| | | | |
|---|---|---|---|
| 2004/0081952 A1* | 4/2004 | Burns | G09B 7/00 434/350 |
| 2004/0088071 A1 | 5/2004 | Kouno | |
| 2004/0140301 A1 | 7/2004 | Blankenship et al. | |
| 2004/0145475 A1* | 7/2004 | Greenberger | G07C 9/00111 340/572.1 |
| 2004/0181382 A1 | 9/2004 | Hu | |
| 2004/0219504 A1* | 11/2004 | Hattie | G09B 7/00 434/353 |
| 2004/0229199 A1* | 11/2004 | Ashley | G09B 7/00 434/323 |
| 2005/0007504 A1 | 1/2005 | Fergason | |
| 2005/0017152 A1 | 1/2005 | Fergason | |
| 2005/0029326 A1 | 2/2005 | Henrikson | |
| 2005/0046584 A1 | 3/2005 | Breed | |
| 2005/0050168 A1 | 3/2005 | Wen et al. | |
| 2005/0101767 A1 | 5/2005 | Clapham et al. | |
| 2005/0103766 A1 | 5/2005 | Iizuka et al. | |
| 2005/0103767 A1 | 5/2005 | Kainec et al. | |
| 2005/0109735 A1 | 5/2005 | Flood | |
| 2005/0128186 A1 | 6/2005 | Shahoain et al. | |
| 2005/0133488 A1 | 6/2005 | Blankenship et al. | |
| 2005/0159840 A1 | 7/2005 | Lin et al. | |
| 2005/0163364 A1 | 7/2005 | Beck | |
| 2005/0189336 A1 | 9/2005 | Ku | |
| 2005/0199602 A1 | 9/2005 | Kaddani et al. | |
| 2005/0230573 A1 | 10/2005 | Ligertwood | |
| 2005/0252897 A1 | 11/2005 | Hsu et al. | |
| 2005/0275913 A1 | 12/2005 | Vesely et al. | |
| 2005/0275914 A1 | 12/2005 | Vesely et al. | |
| 2006/0000257 A1* | 1/2006 | Samadpour | G06F 19/3493 73/23.2 |
| 2006/0014130 A1 | 1/2006 | Weinstein | |
| 2006/0035205 A1* | 2/2006 | Dobson | G07C 9/00111 434/350 |
| 2006/0076321 A1 | 4/2006 | Maev | |
| 2006/0121433 A1* | 6/2006 | Adams | G09B 7/02 434/323 |
| 2006/0122834 A1* | 6/2006 | Bennett | G10L 15/1822 704/256 |
| 2006/0136183 A1 | 6/2006 | Choquet | |
| 2006/0140502 A1 | 6/2006 | Tseng et al. | |
| 2006/0141430 A1* | 6/2006 | Hutchinson | G09B 7/02 434/236 |
| 2006/0141441 A1* | 6/2006 | Hutchinson | G09B 7/02 434/350 |
| 2006/0154226 A1 | 7/2006 | Maxfield | |
| 2006/0163227 A1 | 7/2006 | Hillen et al. | |
| 2006/0163228 A1 | 7/2006 | Daniel | |
| 2006/0166174 A1 | 7/2006 | Rowe | |
| 2006/0169682 A1 | 8/2006 | Kainec et al. | |
| 2006/0173619 A1 | 8/2006 | Brant et al. | |
| 2006/0189260 A1 | 8/2006 | Sung | |
| 2006/0207980 A1 | 9/2006 | Jocovetty et al. | |
| 2006/0213892 A1 | 9/2006 | Ott | |
| 2006/0214924 A1 | 9/2006 | Kawamoto et al. | |
| 2006/0226137 A1 | 10/2006 | Huismann et al. | |
| 2006/0241432 A1 | 10/2006 | Herline et al. | |
| 2006/0252543 A1 | 11/2006 | Van Noland et al. | |
| 2006/0258447 A1 | 11/2006 | Baszucki et al. | |
| 2007/0034611 A1 | 2/2007 | Drius et al. | |
| 2007/0038400 A1 | 2/2007 | Lee et al. | |
| 2007/0045488 A1 | 3/2007 | Shin | |
| 2007/0088536 A1 | 4/2007 | Ishikawa | |
| 2007/0112889 A1 | 5/2007 | Cook et al. | |
| 2007/0188606 A1 | 8/2007 | Atkinson et al. | |
| 2007/0198117 A1 | 8/2007 | Wajhuddin | |
| 2007/0211026 A1 | 9/2007 | Ohta et al. | |
| 2007/0221797 A1 | 9/2007 | Thompson et al. | |
| 2007/0231780 A1* | 10/2007 | Shulman | G09B 7/08 434/350 |
| 2007/0256503 A1 | 11/2007 | Wong et al. | |
| 2007/0264620 A1 | 11/2007 | Maddix et al. | |
| 2007/0277611 A1 | 12/2007 | Portzgen et al. | |
| 2007/0291035 A1 | 12/2007 | Vesely et al. | |
| 2008/0021311 A1 | 1/2008 | Goldbach | |
| 2008/0027594 A1 | 1/2008 | Jump et al. | |
| 2008/0031774 A1 | 2/2008 | Magnant et al. | |
| 2008/0038702 A1 | 2/2008 | Choquet | |
| 2008/0061049 A1 | 3/2008 | Albrecht | |
| 2008/0078811 A1 | 4/2008 | Hillen et al. | |
| 2008/0078812 A1 | 4/2008 | Peters et al. | |
| 2008/0107345 A1 | 5/2008 | Melikian | |
| 2008/0117203 A1 | 5/2008 | Gering | |
| 2008/0120075 A1 | 5/2008 | Wloka | |
| 2008/0128398 A1 | 6/2008 | Schneider | |
| 2008/0135533 A1 | 6/2008 | Ertmer et al. | |
| 2008/0140815 A1 | 6/2008 | Brant et al. | |
| 2008/0149686 A1 | 6/2008 | Daniel et al. | |
| 2008/0203075 A1 | 8/2008 | Feldhausen et al. | |
| 2008/0233550 A1 | 9/2008 | Solomon | |
| 2008/0249998 A1 | 10/2008 | Dettinger et al. | |
| 2008/0303197 A1 | 12/2008 | Paquette et al. | |
| 2008/0307053 A1* | 12/2008 | Mitnick | G06F 17/30241 709/205 |
| 2008/0314884 A1 | 12/2008 | Stoger et al. | |
| 2009/0015585 A1 | 1/2009 | Klusza | |
| 2009/0021514 A1 | 1/2009 | Klusza | |
| 2009/0023124 A1* | 1/2009 | Towell | G06Q 10/06 434/322 |
| 2009/0045183 A1 | 2/2009 | Artelsmair et al. | |
| 2009/0050612 A1 | 2/2009 | Serruys et al. | |
| 2009/0057286 A1 | 3/2009 | Ihara et al. | |
| 2009/0109128 A1 | 4/2009 | Nangle | |
| 2009/0152251 A1 | 6/2009 | Dantinne et al. | |
| 2009/0173726 A1 | 7/2009 | Davidson et al. | |
| 2009/0184098 A1 | 7/2009 | Daniel et al. | |
| 2009/0186328 A1* | 7/2009 | Robinson | G09B 5/14 434/350 |
| 2009/0197228 A1 | 8/2009 | Afshar et al. | |
| 2009/0197234 A1* | 8/2009 | Creamer | G09B 7/00 434/350 |
| 2009/0200281 A1 | 8/2009 | Hampton | |
| 2009/0200282 A1 | 8/2009 | Hampton | |
| 2009/0231423 A1 | 9/2009 | Becker et al. | |
| 2009/0257655 A1 | 10/2009 | Melikian | |
| 2009/0259444 A1 | 10/2009 | Dolansky et al. | |
| 2009/0298024 A1 | 12/2009 | Batzier et al. | |
| 2009/0312958 A1 | 12/2009 | Dai et al. | |
| 2009/0322756 A1* | 12/2009 | Robertson | G06F 17/30716 345/440 |
| 2009/0325699 A1 | 12/2009 | Delgiannidis | |
| 2010/0012017 A1 | 1/2010 | Miller | |
| 2010/0012637 A1 | 1/2010 | Jaeger | |
| 2010/0021051 A1 | 1/2010 | Melikian | |
| 2010/0028844 A1* | 2/2010 | Wiseman | G09B 7/02 434/322 |
| 2010/0035220 A1* | 2/2010 | Herz | G09B 7/00 434/236 |
| 2010/0047757 A1* | 2/2010 | McCurry | G09B 7/02 434/353 |
| 2010/0048273 A1 | 2/2010 | Wallace et al. | |
| 2010/0062405 A1 | 3/2010 | Zboray et al. | |
| 2010/0062406 A1 | 3/2010 | Zboray et al. | |
| 2010/0092935 A1* | 4/2010 | Root | G09B 7/02 434/247 |
| 2010/0096373 A1 | 4/2010 | Hillen et al. | |
| 2010/0121472 A1 | 5/2010 | Babu et al. | |
| 2010/0133247 A1 | 6/2010 | Mazumder et al. | |
| 2010/0133250 A1 | 6/2010 | Sardy et al. | |
| 2010/0176107 A1 | 7/2010 | Bong | |
| 2010/0190145 A1* | 7/2010 | Singer | G09B 7/04 434/335 |
| 2010/0201803 A1 | 8/2010 | Melikian | |
| 2010/0221693 A1* | 9/2010 | Gupta | G09B 5/14 434/362 |
| 2010/0224610 A1 | 9/2010 | Wallace | |
| 2010/0276396 A1 | 11/2010 | Cooper | |
| 2010/0279265 A1* | 11/2010 | Heffernan | G09B 7/02 434/350 |
| 2010/0291531 A1* | 11/2010 | Chandler | G09B 7/02 434/433 |

(56) References Cited

U.S. PATENT DOCUMENTS

| | | |
|---|---|---|
| 2010/0299101 A1 | 11/2010 | Shimada et al. |
| 2010/0307249 A1 | 12/2010 | Lesage et al. |
| 2010/0314362 A1 | 12/2010 | Albrecht |
| 2010/0326962 A1 | 12/2010 | Calla et al. |
| 2011/0006047 A1 | 1/2011 | Penrod |
| 2011/0048273 A1 | 3/2011 | Colon |
| 2011/0052046 A1 | 3/2011 | Melikian |
| 2011/0059423 A1* | 3/2011 | Kadar ............... G09B 5/06 434/185 |
| 2011/0060568 A1 | 3/2011 | Goldfine |
| 2011/0082728 A1 | 4/2011 | Melikian |
| 2011/0091846 A1 | 4/2011 | Kreindl et al. |
| 2011/0114615 A1 | 5/2011 | Daniel et al. |
| 2011/0116076 A1 | 5/2011 | Chantry et al. |
| 2011/0117527 A1 | 5/2011 | Conrardy |
| 2011/0122495 A1 | 5/2011 | Togashi |
| 2011/0183304 A1 | 7/2011 | Wallace et al. |
| 2011/0187746 A1 | 8/2011 | Suto et al. |
| 2011/0187859 A1 | 8/2011 | Edelson |
| 2011/0229864 A1 | 9/2011 | Short et al. |
| 2011/0248864 A1 | 10/2011 | Becker et al. |
| 2011/0276642 A1* | 11/2011 | Gioev ............... G09B 5/00 709/206 |
| 2011/0316516 A1 | 12/2011 | Schiefermuller et al. |
| 2012/0077173 A1* | 3/2012 | Crawford ............ G09B 7/02 434/322 |
| 2012/0094265 A1* | 4/2012 | Boler ................ G09B 7/00 434/362 |
| 2012/0122062 A1 | 5/2012 | Yang et al. |
| 2012/0124460 A1* | 5/2012 | Brletic ............. G09B 19/00 715/212 |
| 2012/0189993 A1 | 7/2012 | Kinding et al. |
| 2012/0244510 A1* | 9/2012 | Watkins, Jr. ........ G09B 7/00 434/362 |
| 2012/0291172 A1 | 11/2012 | Wills et al. |
| 2012/0298640 A1 | 11/2012 | Conrardy et al. |
| 2013/0026150 A1 | 1/2013 | Chantry et al. |
| 2013/0040270 A1 | 2/2013 | Albrecht |
| 2013/0049976 A1 | 2/2013 | Maggiore |
| 2013/0075380 A1 | 3/2013 | Albrech et al. |
| 2013/0119040 A1 | 5/2013 | Suraba et al. |
| 2013/0170259 A1 | 7/2013 | Chang et al. |
| 2013/0182070 A1 | 7/2013 | Peters et al. |
| 2013/0183645 A1 | 7/2013 | Wallace et al. |
| 2013/0189657 A1 | 7/2013 | Wallace et al. |
| 2013/0189658 A1 | 7/2013 | Peters et al. |
| 2013/0203029 A1 | 8/2013 | Choquet |
| 2013/0206740 A1 | 8/2013 | Pfeifer et al. |
| 2013/0209976 A1 | 8/2013 | Postlethwaite et al. |
| 2013/0226674 A1* | 8/2013 | Field ............... G06Q 50/20 705/7.38 |
| 2013/0227402 A1* | 8/2013 | Rossen-Knill ...... G06F 11/3438 715/255 |
| 2013/0230832 A1 | 9/2013 | Peters et al. |
| 2013/0231980 A1 | 9/2013 | Elgart et al. |
| 2013/0252214 A1 | 9/2013 | Choquet |
| 2013/0288211 A1 | 10/2013 | Patterson et al. |
| 2013/0290211 A1* | 10/2013 | Cho ................ G06Q 50/20 705/327 |
| 2013/0309642 A1* | 11/2013 | Singletary ......... G09B 19/00 434/236 |
| 2013/0309648 A1* | 11/2013 | Park ............... G09B 5/00 434/350 |
| 2013/0327747 A1 | 12/2013 | Dantinne |
| 2013/0330704 A1* | 12/2013 | Creamer ........... G09B 7/00 434/362 |
| 2013/0342678 A1 | 12/2013 | McAninch et al. |
| 2014/0038143 A1 | 2/2014 | Daniel |
| 2014/0042136 A1 | 2/2014 | Daniel et al. |
| 2014/0065584 A1 | 3/2014 | Wallace et al. |
| 2014/0065592 A1* | 3/2014 | Strang ............. G09B 5/00 434/350 |
| 2014/0134580 A1 | 5/2014 | Becker |
| 2014/0201707 A1* | 7/2014 | Schroeder .......... G06F 8/30 717/106 |
| 2014/0263224 A1 | 9/2014 | Becker |
| 2014/0272835 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0346158 A1 | 11/2014 | Matthews |
| 2015/0056584 A1 | 2/2015 | Boulware et al. |
| 2015/0056585 A1 | 2/2015 | Boulware et al. |
| 2015/0056586 A1 | 2/2015 | Penrod |
| 2015/0072323 A1* | 3/2015 | Postlethwaite ...... G09B 5/00 434/234 |
| 2015/0125836 A1 | 5/2015 | Daniel |
| 2015/0194073 A1 | 7/2015 | Becker et al. |
| 2015/0199912 A1* | 7/2015 | Wandler ............ G09B 5/125 434/362 |
| 2015/0235565 A1 | 8/2015 | Postlethwaite |
| 2015/0248845 A1 | 9/2015 | Postlethwaite |
| 2015/0326458 A1* | 11/2015 | Gottlieb ........... H04R 3/005 709/224 |
| 2016/0093233 A1 | 3/2016 | Boulware |
| 2016/0125763 A1 | 5/2016 | Becker |
| 2016/0148515 A1* | 5/2016 | Augusto ........... G09B 5/00 434/365 |
| 2016/0203734 A1 | 7/2016 | Boulware |
| 2016/0203735 A1 | 7/2016 | Boulware |
| 2016/0260261 A1 | 9/2016 | Hsu |
| 2016/0293025 A1* | 10/2016 | Marr ............... G06Q 10/109 |
| 2016/0364819 A1* | 12/2016 | Salimi ............. G06Q 50/205 |
| 2017/0053557 A1 | 2/2017 | Daniel |
| 2017/0084197 A1* | 3/2017 | Crouse ............. G09B 19/025 |

FOREIGN PATENT DOCUMENTS

| | | |
|---|---|---|
| CN | 101209512 | 7/2008 |
| CN | 101214178 | 7/2008 |
| CN | 201083660 | 7/2008 |
| CN | 201149744 | 11/2008 |
| CN | 101406978 | 4/2009 |
| CN | 101419755 | 4/2009 |
| CN | 201229711 | 4/2009 |
| CN | 101571887 | 11/2009 |
| CN | 101587659 | 11/2009 |
| CN | 101661589 | 3/2010 |
| CN | 102053563 | 5/2011 |
| CN | 102083580 | 6/2011 |
| CN | 102202836 | 9/2011 |
| CN | 202053009 | 11/2011 |
| CN | 202684308 U | 1/2013 |
| CN | 203503228 | 3/2014 |
| CN | 103871279 | 6/2014 |
| DE | 2833638 | 2/1980 |
| DE | 3046634 | 1/1984 |
| DE | 3244307 | 5/1984 |
| DE | 3522581 | 1/1987 |
| DE | 4037879 | 6/1991 |
| DE | 19615069 | 10/1997 |
| DE | 19739720 | 10/1998 |
| DE | 19834205 | 2/2000 |
| DE | 20009543 | 8/2001 |
| DE | 102005047204 | 4/2007 |
| DE | 102006048165 | 1/2008 |
| DE | 102010038902 | 2/2012 |
| DE | 202012013151 | 2/2015 |
| EP | 0008527 | 3/1980 |
| EP | 0108599 | 5/1984 |
| EP | 0127299 | 12/1984 |
| EP | 0145891 | 6/1985 |
| EP | 0319623 | 10/1990 |
| EP | 0852986 | 7/1998 |
| EP | 1527852 | 5/2005 |
| EP | 1905533 | 4/2008 |
| ES | 2274736 | 5/2007 |
| FR | 1456780 | 3/1965 |
| FR | 2827066 | 1/2003 |
| FR | 2926660 | 7/2009 |
| GB | 1455972 | 11/1976 |

(56) References Cited

FOREIGN PATENT DOCUMENTS

| | | |
|---|---|---|
| GB | 1511608 | 5/1978 |
| GB | 2254172 | 9/1992 |
| GB | 2435838 | 9/2007 |
| GB | 2454232 | 5/2009 |
| JP | 02-224877 | 9/1990 |
| JP | 05-329645 | 12/1993 |
| JP | 07-047471 | 2/1995 |
| JP | 07-232270 | 9/1995 |
| JP | 08-505091 | 4/1996 |
| JP | 08-150476 | 6/1996 |
| JP | H08221107 | 8/1996 |
| JP | 08-132274 | 5/1998 |
| JP | 2000-167666 | 6/2000 |
| JP | 2001-071140 | 3/2001 |
| JP | 2002278670 | 9/2002 |
| JP | 2002-366021 | 12/2002 |
| JP | 2003-200372 | 7/2003 |
| JP | 2003-271048 | 9/2003 |
| JP | 2003-326362 | 11/2003 |
| JP | 2004025270 | 1/2004 |
| JP | 2006006604 | 1/2006 |
| JP | 2006-175205 | 7/2006 |
| JP | 2006-281270 | 10/2006 |
| JP | 2007290025 | 11/2007 |
| JP | 2009500178 | 1/2009 |
| JP | 2009160636 | 7/2009 |
| JP | 2010-231792 | 10/2010 |
| JP | 2012024867 | 2/2012 |
| KR | 100876425 | 12/2008 |
| KR | 20090010693 | 1/2009 |
| KR | 20110068544 | 6/2011 |
| RU | 527045 | 7/1995 |
| RU | 2317183 | 2/2008 |
| RU | 2008108601 | 11/2009 |
| SU | 10388963 | 8/1983 |
| WO | 1998/045078 | 10/1998 |
| WO | 2000-237872 | 9/2000 |
| WO | 2001/012376 | 2/2001 |
| WO | 2001/043910 | 6/2001 |
| WO | 2001/058400 | 8/2001 |
| WO | 2004029549 | 4/2004 |
| WO | 2005/102230 | 11/2005 |
| WO | 2005110658 | 11/2005 |
| WO | 2006/034571 | 4/2006 |
| WO | 2007039278 | 4/2007 |
| WO | 2009/060231 | 5/2009 |
| WO | 2009/120921 | 10/2009 |
| WO | 2009/149740 | 12/2009 |
| WO | 2010/000003 | 1/2010 |
| WO | 2010/044982 | 4/2010 |
| WO | 2010/091493 | 8/2010 |
| WO | 2011/045654 | 4/2011 |
| WO | 2011045654 | 4/2011 |
| WO | 2011/058433 | 5/2011 |
| WO | 2011059502 | 5/2011 |
| WO | 2011/067447 | 6/2011 |
| WO | 2011088412 A1 | 7/2011 |
| WO | 2011/097035 | 8/2011 |
| WO | 2012016851 | 2/2012 |
| WO | 2012/082105 | 6/2012 |
| WO | 2012/143327 | 10/2012 |
| WO | 2013/014202 | 1/2013 |
| WO | 2013025672 | 2/2013 |
| WO | 2013061518 | 5/2013 |
| WO | 2013/114189 | 8/2013 |
| WO | 2013119749 | 8/2013 |
| WO | 2013/175079 | 11/2013 |
| WO | 2013186413 | 12/2013 |
| WO | 2014/007830 | 1/2014 |
| WO | 2014/019045 | 2/2014 |
| WO | 2014/020386 | 2/2014 |
| WO | 2014140720 | 9/2014 |
| WO | 2014184710 | 11/2014 |
| WO | 2016/137578 | 9/2016 |

OTHER PUBLICATIONS

Xie et al., "A Real-Time Welding Training System Base on Virtual Reality," Wuhan Onew Technology Co., Lid, IEEE Virtual Reality Conference 2015, Mar. 23-27, Arles France, pp. 309-310.
Office Action from U.S. Appl. No. 14/293,826 dated Jul. 21, 2017.
Office Action from Chinese Application No. 201480025614.3 dated Jun. 9, 2017.
Notification of Reason for Refusal from KR Application No. 10-2015-7002697 dated Sep. 25, 2017.
Exhibit B from Declaration of Morgan Lincoln in *Lincoln Electric Co. et al. v. Seabery Soluciones, S.L. et al.*, Case No. 1:15-cv-01575-DCN, dated Dec. 20, 2016, 5 pages.
International Search Report and Written Opinion from PCT/IB2015/000777 dated Dec. 15, 2016.
International Search Report and Written Opinion from PCT/IB2015/000814 dated Dec. 15, 2016.
"High Performance Computer Architectures: A Historical Perspective," downloaded May 5, 2016, http://homepages.inf.ed.ac.uk/cgi/mi/comparch. pl?Paru/perf.html,Paru/perf-f.html,Paru/menu-76.html, 3 pages.
Aiteanu et al., "Generation and Rendering of a Virtual Welding Seam in an Augmented Reality Training Environment," Proceedings of the Sixth IASTED International Conference on Visualization, Imaging and Image Processing, Aug. 28-30, 2006, 8 pages, allegedly Palma de Mallorca, Spain. Ed. J.J. Villaneuva. ACTA Press.
Tschirner et al., "A Concept for the Application of Augmented Reality in Manual Gas Metal Arc Welding," Proceedings of the International Symposium on Mixed and Augmented Reality; 2 pages; 2002.
Penrod, "New Welder Training Tools," EWI PowerPoint presentation, 16 pages, allegedly 2008.
Fite-Georgel, "Is there a Reality in Industrial Augmented Reality?" 10th IEEE International Symposium on Mixed and Augmented Reality (ISMAR), 10 pages, allegedly 2011.
Hillers et al., "Real time Arc-Welding Video Observation System," 62nd International Conference of IIW, Jul. 12-17, 2009, 5 pages, allegedly Singapore 2009.
Advance Program of American Welding Society Programs and Events, Nov. 11-14, 2007, 31 pages, Chicago.
Terebes, examples from http://www.terebes.uni-bremen.de., 6 pages.
Sandor et al., "PAARTI: Development of an Intelligent Welding Gun for BMW," PIA2003, 7 pages, Tokyo, 2003.
ARVIKA Forum Vorstellung Projekt PAARI, BMW Group Virtual Reality Center, 4 pages, Nuernberg, 2003.
Sandor et al., "Lessons Learned in Designing Ubiquitous Augmented Reality User Interfaces," 21 pages, allegedly from Emerging Technologies of Augmented Reality: Interfaces Eds. Haller, M.; Billinghurst, M.; Thomas, B. Idea Group Inc., 2006.
Impact Welding: examples from current and archived website, trade shows, etc. See, e.g., http://www.impactwelding..com, 53 pages.
http://www.nsrp.org/6-Presentations/WDVirtual_Welder.pdf (Virtual Reality Welder Training, Project No. SI051, Navy ManTech Program, Project Review for ShipTech 2005), 22 pages, Biloxi, MS.
https://app.aws_org/w/r/www/wj/2005/031WJ_2005_03.pdf (AWS Welding Journal, Mar. 2005 (see, e.g., p. 54))., 114 pages.
https://app.aws.org/conferences/defense/live index.html (AWS Welding in the Defense Industry conference schedule, 2004), 12 pages.
https://app.aws.org/wj/2004/04/052/njc (AWS Virtual Reality Program to Train Welders for Shipbuilding, workshop information, 2004), 7 pages.
https://app.aws.org/wj/2007/11WJ200711.pdf (AWS Welding Journal, Nov. 2007), 240 pages.
American Welding Society, "Vision for Welding Industry," 41 pages.
Energetics, Inc. "Welding Technology Roadmap," Sep. 2000, 38 pages.
Aiteanu et al., "Computer-Aided Manual Welding Using an Augmented Reality Supervisor," Sheet Metal Welding Conference XII, Livonia, MI, May 9-12, 2006, 14 pages.

(56) References Cited

OTHER PUBLICATIONS

Hillers et al., "Augmented Reality—Helmet for the Manual Welding Process," Institute of Automation, University of Bremen, Germany, 21 pages.

Aiteanu et al., "A Step Forward in Manual Welding: Demonstration of Augmented Reality Helmet" Institute of Automation, University of Bremen, Germany, Proceedings of the Second IEEE and ACM International Symposium on Mixed and Augmented Reality; 2003, 2 pages.

ArcSentry, "Weld Quality Monitoring System," Native American Technologies, allegedly 2002, 5 pages.

P/NA.3, "Process Modelling and Optimization," Native American Technologies, allegedly 2002, 5 pages.

Hillers et al., "TEREBES: Welding Helmet with AR Capabilities," Institute of Automatic University Bremen; Institute of Industrial Engineering and Ergonomics, 10 pages, allegedly 2004.

Sheet Metal Welding Conference XII, American Welding Society Detroit Section, May 2006, 11 pages.

Fast et al., "Virtual Training for Welding," Proceedings of the Third IEEE and ACM International Symposium on Mixed and Augmented Reality (ISMAR 2004), 2 pages.

Amended Answer to Complaint with Exhibit A filed by Seabery North America Inc. in *Lincoln Electric Co. et al. v. Seabery Soluciones, S.L. et al.*, Case No. 1:15-cv-01575-DCN, doc. No. 44, filed Mar. 1, 2016, in the U.S. District court for the Northern District of Ohio, 19 pages.

Amended Answer to Complaint with Exhibit A filed by Seabery Soluciones SL in *Lincoln Electric Co. et al. v. Seabery Soluciones, S.L. et al.*, Case No. 1:15-cv-01575-DCN, doc. No. 45, filed Mar. 1, 2016, in the U.S. District Court for the Northern District of Ohio, 19 pages.

Reply to Amended Answer to Complaint for Patent Infringement filed by Lincoln Electric Co., Lincoln Global, Inc. in *Lincoln Electric Co. et al. v. Seabery Soluciones, S.L. et al.*, Case No. 1:15-cv-01575-DCN, doc. No. 46, filed Mar. 22, 2016, in the U.S. District Court for the Northern District of Ohio, 5 pages.

Answer for Patent Infringement filed by Lincoln Electric Company, Lincoln Global, Inc. in *Lincoln Electric Co. et al. v. Seabery Soluciones, S.L. et al.*, Case No. 1:15-cv-01575-DCN, doc. No. 47, filed Mar. 22, 2016, in the U.S. District Court for the Northern District of Ohio, 5 pages.

Petition for Inter Partes Review of U.S. Pat. No. 8,747,116, IPR 2016-00749, Apr. 7, 2016; 70 pages.

Petition for Inter Partes Review of U.S. Patent No. RE. 45,398, IPR 2016-00840, Apr. 18, 2016, 71 pages.

Petition for Inter Partes Review of U.S. Pat. No. 9,293,056, IPR 2016-00904, May 9, 2016, 91 pages.

Petition for Inter Partes Review of U.S. Pat. No. 9,293,057, IPR 2016-00905, May 9, 2016, 87 pages.

http://www.vrsim.net/history, downloaded Feb. 26, 2016, 10:04:37 pm.

Complaint for Patent Infringement in *Lincoln Electric Co. et al. v. Seabery Soluciones, S.L. et al.*, Case No. 1:15-av-01575-DCN, doc. No. 1, filed Aug. 10, 2015, in the U.S. District Court for the Northern District of Ohio, 81 pages.

Kobayashi et al., "Simulator of Manual Metal Arc Welding with Haptic Display," Proc. of the 11th International Conf. on Artificial Reality and Telexistence (ICAT), Dec. 5-7, 2001, pp. 175-178, Tokyo, Japan.

Wahi et al., "Finite-Difference Simulation of a Multi-Pass Pipe Weld," vol. L, paper 3/1, International Conference on Structural Mechanics in Reactor Technology, San Francisco, CA, Aug. 15-19, 1977.

Declaration of Dr. Michael Zyda, May 3, 2016, exhibit to IPR 2016-00749.

Declaration of Edward Bohnert, Apr. 27, 2016, exhibit to IPR 2016-00749.

Swantec corporate web page downloaded Apr. 19, 2016, http://www.swantec.com/technology/numerical-simulation/.

Catalina et al., "Interaction of Porosity with a Planar Solid/Liquid Interface," Metallurgical and Materials Transactions, vol. 35A, May 2004, pp. 1525-1538.

Fletcher Yoder Opinion re RE. 45,398 and U.S. Appl. No. 14/589,317, Sep. 9, 2015, 41 pages.

Kobayashi et al., "Skill Training System of Manual Arc Welding by Means of Face-Shield-Like HMD and Virtual Electrode," Entertainment Computing, vol. 112 of the International Federation for Information Processing (IFIP), Springer Science + Business Media, New York, copyright 2003, pp. 389-396.

G.E. Moore, "No exponential is forever: but Forever can be delayed!," IEEE International Solid-State Circuits Conference, 2003, 19 pages.

International Preliminary Report on Patentability from PCT/IB2015/001084 dated Jan. 26, 2017.

Adams et al., "Adaptively Sampled Particle Fluids," ACM Transactions on Graphics, vol. 26, No. 3, Article 48, Jul. 2007, pp. 48.1-48.7.

Bargteil et al., "A Texture Synthesis Method for Liquid Animations," Eurographics/ ACM SIGGRAPH Symposium on Computer Animation, 2006, pp. 345-351.

Bargteil et al., "A Semi-Lagrangian Contouring Method for Fluid Simulation," ACM Transactions on Graphics, vol. 25, No. 1, Jan. 2006, pp. 19-38.

Chentanez et al., "Liquid Simulation on Lattice-Based Tetrahedral Meshes," Eurographics/ACM SIGGRAPH Symposium on Computer Animation, 2007, 10 pages.

Chentanez et al., "Simultaneous Coupling of Fluids and Deformable Bodies," Eurographics/ ACM SIGGRAPH Symposium on Computer Animation, 2006, pp. 83-89.

Clausen et al., "Simulating Liquids and Solid-Liquid Interactions with Lagrangian Meshes," ACM Transactions on Graphics, vol. 32, No. 2, Article 17, Apr. 2013, pp. 17.1-17.15.

Feldman et al., "Animating Suspended Particle Explosions," Computer Graphics Proceedings, Annual Conference Series, Jul. 27-31, 2003, pp. 1-8.

Feldman et al., "Fluids in Deforming Meshes," Eurographics/ACM SIGGRAPH Symposium on Computer Animation, 2005, pp. 255-259.

Foster et al., "Practical Animation of Liquids," ACM SIGGRAPH, Aug. 12-17, 2001, Los Angeles, CA, pp. 23-30.

Foster et al., "Realistic Animation of Liquids," Graphical Models and Image Processing, vol. 58, No. 5, Sep. 1996, pp. 471-483.

Goktekin et al., "A Method for Animating Viscoelastic Fluids," Computer Graphics Proceedings, Annual Conference Series, Aug. 8-12, 2004, pp. 1-6.

Holmberg et al., "Efficient Modeling and Rendering of Turbulent Water over Natural Terrain," Proceedings of the 2nd International Conference on Computer Graphics and Interactive Techniques in Australasia and South East Asia, Singapore, Jun. 15-18, 2004, pp. 15-22.

Irving et al., "Efficient Simulation of Large Bodies of Water by Coupling Two and Three Dimensional Techniques," ACM Transactions on Graphics (TOG), vol. 25, Issue 3, Jul. 2006, pp. 805-811.

Kass et al., "Rapid, Stable Fluid Dynamics for Computer Graphics," Computer Graphics, vol. 24, No. 4, Aug. 1990, pp. 49-57.

Klinger et al., "Fluid Animation with Dynamic Meshes," Computer Graphics Proceedings, Annual Conference Series, Jul. 30-Aug. 3, 2006, pp. 820-825.

Muller et al., "Particle-Based Fluid Simulation for Interactive Applications," Eurographics/SIGGRAPH Symposium on Computer Animation (2003), pp. 154-159 and 372.

O'Brien et al., "Dynamic Simulation of Splashing Fluids," Proceedings of Computer Animation, Apr. 19-21, 1995, Geneva, Switzerland, pp. 198-205.

Premoze et al., "Particle-Based Simulation of Fluids," EUROGRAPHICS, vol. 22, No. 3, 2003, 10 pages.

Rasmussen et al., "Directable Photorealistic Liquids," Eurographics/ACM SIGGRAPH Symposium on Computer Animation, 2004, pp. 193-202.

Stam, "Stable Fluids," SIGGRAPH 99 Conference Proceedings, Annual Conference Series, Aug. 1999, pp. 121-128.

(56) References Cited

OTHER PUBLICATIONS

Thurey et al., "Real-time Breaking Waves for Shallow Water Simulations," Proceedings of the Pacific Conference on computer Graphics and Applications, Maui, HI Oct. 29-Nov. 2, 2007, 8 pages.
Office Action from U.S. Appl. No. 14/190,812 dated Feb. 23, 2017.
Office Action from U.S. Appl. No. 14/552,739 dated Feb. 17, 2017.
Office Action from U.S. Appl. No. 14/615,637 dated Apr. 27, 2017.
Office Action from Chinese Application No. 201480025359.2 dated Feb. 28, 2017.
Office Action from Chinese Application No. 201380076368.X dated Mar. 1, 2017.
NSRP—Virtual Welding—A Low Cost Virtual Reality Welder Training System—Phase II—Final Report; Feb. 29, 2012; Kenneth Fast, Jerry Jones, Valerie Rhoades; 53 pages.
Yaoming, "Applications of Microcomputer in Robot Technology," Scientific and Technical Documentation Press, Sep. 1987, pp. 360-365.
Extended European Search Report from EP Application No. 10860823.3 dated Jun. 6, 2017.
Office Action from U.S. Appl. No. 14/526,914 dated Jun. 6, 2017.
Office Action from U.S. Appl. No. 14/827,657 dated May 26, 2017.
Office Action from U.S. Appl. No. 14/829,161 dated Jul. 28, 2017.
Office Action in CN Application No. 201480012861.X dated Jul. 18, 2017.
Office Action in CN Application No. 201610179195.X dated Jul. 19, 2017.
Office Action in CN Application No. 201480025985.1 dated Aug. 10, 2017.
Code Aster (Software) EDF (France), Oct. 2001.
Cooperative Research Program, "Virtual Reality Welder Training," Summary Report SR 0512, 4 pages, Jul. 2005.
CS Wave, "The Virtual Welding Trainer," 6 pages, 2007.
CS Wave, "A Virtual learning tool for welding motion," 10 pages, Mar. 14, 2008.
Desroches, "Code-Aster, Note of use for calculations of welding," Instruction manual U2.03 booklet: Thermomechanical, Document: U2.03.05, Oct. 1, 2003.
D'huart et al., "Virtual Environment for Training: An Art of Enhancing Reality," 6th International Conference, ITS 20002, Biarritz, France and San Sebastian, Spain, 6 pages, Jun. 2002.
Dotson, "Augmented Reality Welding Helmet Prototypes How Awesome the Technology Can Get," Sep. 26, 2012, Retrieved from the Internet: URL:http://siliconangle.com/blog/2012/09/26/augmented-reality-welding-helmet-prototypes-how-awesome-the-technology-can-get/, 1 page, retrieved on Sep. 26, 2014.
Echtler et al., "The Intelligent Welding Gun: Augmented Reality of Experimental Vehicle Construction," Virtual and Augmented Reality Applications in Manufacturing, 17, pp. 1-27, Springer Verlag, 2003.
Edison Welding Institute, "E-Weld Predictor," 3 pages, 2008.
Eduwelding+, "Weld Into the Future, Online Welding Seminar—A virtual training environment," 123arc.com; 4 pages, 2005.
Eduwelding+, "Training Activities with arc+ simulator—Weld Into the Future," Online Welding Simulator—A virtual training environment; 123arc.com; 6 pages, May 2008.
The Fabricator, "Virtually Welding—Training in a virtual environment gives welding students a leg up," 4 pages, Mar. 2008.
Fast et al., "Virtual Training for Welding", Mixed and Augmented Reality, 2004, ISMAR 2004, Third IEEE and CM International Symposium on Arlington, VA, Nov. 2-5, 2004.
Fronius, ARS Electronica Linz GmbH, "High-speed video technology is applied to research on welding equipment, and the results are visualized in the CAVE," 2 pages, May 18, 1997.
Joanneum, "Fronius—virtual welding," 2 pages, May 12, 2008.
Garcia-Allende et al., "Defect Detection in Arc-Welding Processes by Means of the Line-to-Continuum Method and Feature Selection," www.mdpi.com/journal/sensors, Sensors, 2009, 9, 7753-7770, doi: 10.3390/s91007753.

Wu, "Microcomputer-based welder training simulator," Computers in Industry, vol. 20, No. 3, Oct. 1992, pp. 321-325, XP000205597, Elsevier Science Publishers, Amsterdam, NL.
Wuhan Onew Technology Co. Ltd., "ONEW-360 Welding Training Simulator," http://en.onewtech.com/_d276479751.htm as accessed on Jul. 10, 2015, 14 pages.
Office Action from U.S. Appl. No. 14/190,812 dated Jun. 14, 2016.
Response to Office Action from U.S. Appl. No. 14/190,812, filed Aug. 4, 2016.
Office Action from Chinese Application No. 201280075678.5 dated Jul. 5, 2016.
Office Action from Chinese Application No. 201480027306.4 dated Aug. 3, 2016.
Office Action from Chinese Application No. 201380017661.9 dated Aug. 22, 2016.
International Preliminary Report on Patentability from PCT/IB2015/000161 dated Aug. 25, 2016.
International Preliminary Report on Patentability from PCT/IB2015/000257 dated Sep. 15, 2016.
Gonzales, "RV-Sold: simulator virtual para la formacion de soldadores," Deformacion Metalica, Es. vol. 34, No. 301 Jan. 1, 2008.
Kemppi ProTrainer, product data, 3 pages, printed Jan. 14, 2015.
Nasios, Improving Chemical Plant Safety Training Using Virtual Reality, thesis submitted to the University of Nottingham for the Degree of Doctor of Philosophy, 313 pages, Dec. 2001.
Leap Motion, Inc., product information, copyright 2013, 14 pages.
Learning Labs, Inc., Seabery, Soldamatic Augmented Reality Welding Trainers, 4 pages, printed Mar. 20, 2014.
Lim et al., "Automatic classification of weld defects using simulated data and MLP neural network," Insight, vol. 49, No. 3, Mar. 2007.
Seabury Soluciones, SOLDAMATIC Welding Trainer Simulator, 30 pages, printed Jan. 14, 2015.
Terebes, Institute of Automation, University of Bremen, Project Motivation Problems Using Traditional Welding Masks, 2 pages, 2015.
Weld nut, Wikipedia, 2 pages, printed Feb. 6, 2014.
Weldplus, Welding Simulator, 2 pages, printed Jan. 14, 2015.
NeldWatch Software/Visible Welding, 4 pages, website printout, 2015.
International Search Report and Written Opinion from PCT/IB2015/000777 dated Sep. 21, 2015.
International Search Report and Written Opinion from PCT/IB2015/000814 dated Nov. 5, 2015.
International Search Report and Written Opinion from PCT/IB2015/001711 dated Jan. 4, 2016.
Narayan et al., "Computer Aided Design and Manufacturing," pp. 3-4, 14-15, 17-18, 92-95, and 99-100, Dec. 31, 2008.
International Preliminary Report on Patentability from PCT/IB2014/001796 dated Mar. 15, 2016.
Office Action from U.S. Appl. No. 15/077,481 dated May 23, 2016.
Response from U.S. Appl. No. 15/077,481 dated Jun. 23, 2016.
Notice of Allowance from U.S. Appl. No. 15/077,481 dated Aug. 10, 2016.
Office Action from Chinese Application No. 201480025359.2 dated Sep. 26, 2016.
US Provisional Patent Application for "System for Characterizing Manual Welding Operations on Pipe and Other Curved Structures," 35 pages, U.S. Appl. No. 62/055,724 filed Sep. 26, 2014.
Graham, "Texture Mapping," Carnegie Mellon University Class 15-462 Computer Graphics, Lecture 10, 53 pages, dated Feb. 13, 2003.
Guu et al.,"Technique for Simultaneous Real-Time Measurements of Weld Pool Surface Geometry and Arc Force," Welding Research Supplement, pp. 473-482, Dec. 1992.
Hillis et al., "Data Parallel Algorithms", Communications of the ACM, vol. 29, No. 12, p. 1170, Dec. 1986.
Hirche et al., "Hardware Accelerated Per-Pixel Displacement Mapping," 8 pages, 2004.
Hu et al., "Heat and mass transfer in gas metal arc welding. Part 1: the arc," found in ScienceDirect, International Journal of Heat and Mass Transfer 50 (2007), 14 pages, 833-846 Available online on Oct. 24, 2006, http://www.web.mst.edu/~tsai/publications/HU-IJHMT-2007-1-60.pdf.

(56) References Cited

OTHER PUBLICATIONS

Jonsson et al., "Simulation of Tack Welding Procedures in Butt Joint Welding of Plates," Welding Research Supplement, pp. 296-302, Oct. 1985.
Nasios (Bsc), "Improving Chemical Plant Safety Training Using Virtual Reality," Thesis submitted to the University of Nottingham for the Degree of Doctor of Philosophy, 313 pages, Dec. 2001.
The Lincoln Electric Company, "Production Monitoring 2," brochure, four (4) pages, May 2009.
The Lincoln Electric Company, "CheckPoint Production Monitoring," brochure; four (4) pages; http://www.lincolnelectric.com/assets/en_US/products/literature/s232.pdf; Publication S2.32; Issue Date Feb. 2012.
The Lincoln Electric Company, "VRTEX Virtual Reality Arc Welding Trainer," http://www.lincolnelectric.com/en-us/equipment/training-equipment/Pages/vrtex/aspx as accessed on Jul. 10, 2015, 3 pages.
Lincoln Global, Inc., "VRTEX 360: Virtual Reality Arc Welding Trainer," brochure, 4 pages, 2015.
Linholm et al., "NVIDIA Testla: A Unifired Graphics and Computing Architecture," IEEE Computer Society, 2008.
Mahrle et al., "The influence of fluid flow phenomena on the laser beam welding process," Intl. J. of Heat and Fluid Flow, 23, pp. 288-297 (2002).
Mann et al., "Realtime HDR (High Dynamic Range) Video for Eyetap Wearable Computers, FPGA-based Seeing Aids, and Glasseyes (Eyetaps)," 2012 25th IEEE Canadian Conference on Electrical and Computer Engineering (CCECE), pp. 1-6, 6 pages, Apr. 29, 2012.
Mantinband et al., "Autosteroscopic, field-sequential display with full freedom of movement OR Let the display were the shutterglasses," yosh@3ality.com, (Israel) Ltd., 8 pages, 2002.
Mavrikios et al., "A prototype virtual reality-based demonstrator for immersive and interactive simulation of welding processes," International Journal of Computer Integrated manufacturing, Taylor and Francis, Basingstoke, GB, vol. 19, No. 3, pp. 294-300, Apr. 1, 2006.
Mechanisms and Mechanical Devices Sourcebook, Chironis, McGraw Hill, Neil Sclater, 2nd Ed. 1996.
Miller Electric Mfg. Co., "LiveArc Welding Performance Management System," 4 pg. brochure, Dec. 2014.
Miller Electric, "Live Arc, Welding Performance Management System," Owners' Manual—OM-267 357A; 64 pgs., Jul. 2014.
Miller Electric Mfg. Co., "MIG Welding System features weld monitoring software," NewsRoom 2010 (Dialog® File 992), © 2011 Dialog. 2010, http://www.dialogweb.com/cgi/dwclient?reg=1331233430487, three (3) pages, printed Mar. 8, 2012.
N. A. Tech., P/NA.3, "Process Modeling and Optimization," 11 pages, Jun. 4, 2008.
NSRP ASE, "Low-Cost Virtual Reality Welder Training System," 1 Page, 2008.
O'Brien, "Google's Project Glass gets some more details," Jun. 27, 2012, Retrieved from the Internet: http://www.engadget.com/2012/06/27/googles-project-glass-gets-some-more-details/, 1 page, retrieved on Sep. 26, 2014.
Yao et al., "Development of a Robot System for Pipe Welding," 2010 International Conference on Measuring Technology and Mechatronics Automation. Retrieved from the Internet: http://ieeexploreieee.org/stamp/stamp.jsp?tp=&arnumber=54603478&tag=1; pp. 1109-1112, 4 pages.
Porter, "Virtual Reality Welder Trainer, Session 5: Joining Technologies for Naval Applications," earliest date Jul. 14, 2006 (http://weayback.archive.org), Edision Welding Institute; J. Allan Cote, General Dynamics Electric Boat; Timothy D. Gifford, VRSim, and Wim Lam, FCS Controls.
Praxair, "The RealWeld Trainer System," brochure, 2 pages, 2011.
Ratnam et al., "Automatic classification of weld defects using simulated data and an MLP neutral network," Insight vol. 49, No. 3, Mar. 2007.
Reeves, "Particles Systems—A Technique for Modeling a Class of Fuzzy Objects", Computer Graphics 17:3 pp. 359-376, 17 pages, 1983.
Rodjito, "Position tracking and motion prediction using Fuzzy Logic," 81 pages, Colby College, Honors Theses, Paper 520, 2006.
Russell et al., "Artificial Intelligence: A Modem Approach," Prentice-Hall, 1995.
Schoder, "Design and Implementation of a Video Sensor for Closed Loop Control of Back Bead Weld Puddle Width," Massachusetts Institute of Technology, Dept. of Mechanical Engineering, May 27, 1983.
SIMFOR/CESOL, "RV-SOLD" Welding Simulator, Technical and Functional Features, 20 pages, no date available.
Sim Welder, "Train better welders faster," retrieved on Apr. 12, 2010 from: http://www.simwelder.com.
Teeravarunyou et al., "Computer Based Welding Training System," Intl J of Industrial Engineering, 16 (2), pp. 116-125, 2009.
Veiga, "Simulation of a Work Cell in the IGRIP Program," 50 pages, 2006.
ViziTech USA, "Changing the Way America Learns," retrieved on Mar. 27, 2014 from http://vizitechusa.com, 2 pages.
Wade, "Human uses of ultrasound: ancient and modem," Department of Electrical and Computer Engineering, University of California at Santa Barbara 93106, USA. Ultrasonics (Impact Factor: 181), 38(1-8),Apr. 1-5, 2000.
Wang et al., "Study on welder training by means of haptic guidance and virtual reality for arc welding," 2006 IEEE International Conference on Robotics and Biomimetics, ROBIO 2006 ISBN-10: 1424405718, p. 954-958.
White et al., "Virtual welder trainer," 2009 IEEE Virtual Reality Conference, p. 303, 2009.
Office Action from Chinese Application No. 201480025614.3 dated Nov. 28, 2016.
Office Action from U.S. Appl. No. 14/293,700 dated Dec. 28, 2016.
Office Action from U.S. Appl. No. 14/293,826 dated Dec. 30, 2016.
Grahn et al., "Interactive Simulation of Contrast Fluid using Smoothed Particle Hydrodynamics," Jan. 1, 2008, Masters Thesis in Computing Science, Umea University, Department of Computing Science, Umea Sweden, 69 pages.
Vesterlund et al., "Simulation and Rendering of a Viscous Fluid using Smoothed Particle Hydrodynamics," Dec. 3, 2004, Master's Thesis in Computing Science, Umea University, Department of Computing Science, Umea Sweden; 46 pages.
Muller et al., "Point Based Animation of Elastic, Plastic and Melting Objects," Eurographics/ACM SIGGRAPH Symposium on Computer Animation (2004), 11 pages.
Nealen, "Point-Based Animation of Elastic, Plastic, and Melting Objects," CG topics, Feb. 2005, 2 pages.
Tonnesen, "Modeling Liquids and Solids using Thermal Particles," Proceedings of Graphics Interface 1991, pp. 255-262, Calgary, Alberta, 1991.
CUDA, "Programming Guide Version 1.1," Nov. 29, 2007, 143 pages.
Websters II new college dictionary, 3rd ed., Houghton Mifflin Co., copyright 2005, Boston, MA, p. 1271, definition of Wake, 3 pages.
Da Dalto et al., "CS Wave: Learning welding motion in a virtual environment," published in Proceedings of the IIW International Conference, Jul. 10-11, 2008, 19 pages.
CS Wave-Manual, "Virtual Welding Workbench User Manual 3.0," 2007, 25 pages.
Choquet, "ARC+®: Today's Virtual Reality Solution for Welders," published in Proceedings of the IIW International conference, Jul. 10-11, 2008, 19 pages.
Welding Handbook, Welding Science & Technology, American Welding Society, Ninth Ed., Copyright 2001, Appendix A, "Terms and Definitions," 54 pages.
"Virtual Welding: A Low Cost Virtual Reality Welder Training System," NSRP RA 07-01—BRP Oral Review Meeting in Charleston, SC at ATI, Mar. 2008, 6 pages.
Aiteanu, "Virtual and Augmented Reality Supervisor for a New Welding Helmet," Dissertation Nov. 15, 2005, 154 pages.
Screen Shot of CS Wave Exercise 135.FWPG Root Pass Level 1 https://web.archive.org/web/20081128081858/http:/wave.c-s.fr/images/english/snap_evolution2.Jpg, 1 page.

(56) References Cited

OTHER PUBLICATIONS

Screen Shot of CS Wave Control Centre V3.0.0 https://web.archive.org/web/20081128081915/http:/wave.c-s.fr/images/english/snap_evolution4.jpg, 1 page.
Screen Shot of CS Wave Control Centre V3.0.0 https://web.archive.org/web/20081128081817/http:/wave.c-s.fr/mages/english/snap_evolution6.jpg, 1 page.
Da Dalto et al. "CS Wave A Virtual learning tool for the welding motion," Mar. 14, 2008, 10 pages.
Nordruch et al., "Visual Online Monitoring of PGMAW Without a Lighting Unit," Jan. 2005, 14 pages.
Tamasi, "The Evolution of Computer Graphics," NVIDIA, 2008, 36 pages.
VRSim Powering Virtual Reality, www.lincolnelectric.com/en-us/eguipment/training-eguipment/Pages/powered-by-'rsim.aspx, 2016, 1 page.
Hillers et al., "Direct welding arc observation without harsh flicker," 8 pages, allegedly FABTECH International and AWS welding show, 2007.
Declaration of Dr. Michael Zyda, May 3, 2016, exhibit to IPR 2016-00905, 72 pages.
Declaration of Edward Bohnart, Apr. 27, 2016, exhibit to IPR 2016-00905, 23 pages.
Declaration of Dr. Michael Zyda, May 3, 2016, exhibit to IPR 2016-00904, 76 pages.
Declaration of Edward Bohnart, Apr. 27, 2016, exhibit to IPR 2016-00904, 22 pages.
Declaration of Axel Graeser, Apr. 17, 2016, exhibit to IPR 2016-00840, 88 pages.
Arc+—Archived Press Release from WayBack Machine from Jan. 31, 2008-Apr. 22, 2013, https://web.3rchive.org/web/20121006041803/http://www.123certification.com/en/article_press/index.htm, downloaded on Jan. 21, 2016, 3 pages.
Tschirner et al., "Virtual and Augmented Reality for Quality Improvement of Manual Welds," National Institute of Standards and Technology, Jan. 2002, Publication 973, 24 pages.
Wang et al., "Impingement of Filler Droplets and Weld Pool During Gas Metal Arc Welding Process," International Journal of Heat and Mass Transfer, Sep. 1999, 14 pages.
Jeffus, "Welding Principles and Applications," Sixth Edition, 2008, 10 pages.
Renwick et al., "Experimental Investigation of GTA Weld Pool Oscillations," Welding Research—Supplement to the Welding Journal, Feb. 1983, 7 pages.
Phar, "GPU Gems 2 Programming Techniques for High-Performance Graphics and General-Purpose Computation," 2005, 12 pages.
Notice of Allowance from U.S. Appl. No. 15/077,481 dated Feb. 3, 2017.
Office Action from U.S. Appl. No. 14/526,914 dated Feb. 3, 2017.
International Preliminary Report on Patentability from PCT/IB2015/000158 dated Jan. 26, 2017.
Communication Pursuant to Article 94(3) EPC in EP Application No. 13753204.0 dated Mar. 9, 2017.
Decision of Rejection in CN Application No. 201380047141.2 dated Sep. 7, 2017.
Office Action from U.S. Appl. No. 14/190,812 dated Nov. 9, 2016.
International Search Report and Written Opinion from PCT/US10/60129 dated Feb. 10, 2011.
International Search Report and Written Opinion from PCT/US12/45776 dated Oct. 1, 2012.
International Search Report and Written Opinion from PCT/IB2014/002346 dated Feb. 24, 2015.
International Search Report and Written Opinion from PCT/IB2015/000161 dated Jun. 8, 2015.
International Search Report and Written Opinion from PCT/IB2015/000257 dated Jul. 3, 2015.
Office Action from U.S. Appl. No. 12/499,687 dated Oct. 16, 2012.
Response from U.S. Appl. No. 12/499,687 dated Apr. 10, 2013.
Office Action from U.S. Appl. No. 12/499,687 dated Jun. 26, 2013.
Response from U.S. Appl. No. 12/499,687 dated Nov. 25, 2013.
Office Action from U.S. Appl. No. 12/499,687 dated Mar. 6, 2014.
Response from U.S. Appl. No. 12/499,687 dated Sep. 5, 2014.
Office Action from U.S. Appl. No. 12/499,687 dated Nov. 6, 2014.
Office Action from U.S. Appl. No. 12/966,570 dated May 8, 2013.
Response from U.S. Appl. No. 12/966,570 dated Oct. 8, 2013.
Notice of Allowance from U.S. Appl. No. 12/966,570 dated Apr. 29, 2014.
Corrected Notice of Allowance from U.S. Appl. No. 12/966,570 dated Feb. 23, 2015.
Office Action from U.S. Appl. No. 13/543,240 dated Nov. 14, 2014.
Response from U.S. Appl. No. 13/543,240 dated Mar. 13, 2015.
Office Action from U.S. Appl. No. 14/444,173 dated Mar. 18, 2015.
Response from U.S. Appl. No. 14/444,173 dated Jun. 11, 2015.
Notice of Allowance from U.S. Appl. No. 13/543,240 dated Jun. 3, 2015.
Notice of Allowance from U.S. Appl. No. 14/444,173 dated Jun. 24, 2015.
Aidun "Influence of simulated high-g on the weld size of Al-Li-Alloy" Acta Astronautice, vol. 48, No. 2-3, pp. 153-156, 2001.
Boss (engineering), Wikipedia, 1 page, printed Feb. 6, 2014.
CS WAVE, Product Description, 2 pages, printed Jan. 14, 2015.
EnergynTech Inc., Advanced Metals Processing Technology & Flexible Automation for Manufacturing, Virtual Welder, Virtual training system for beginning welders, 2 pages, website printout, 2014.
EnergynTech Inc., Zipper Robot Performing a HiDep Weld, 1 page, website printout, 2014.
Erden, "Skill Assistance with Robot for Manual Welding," Marie Curie Intra-European Fellowship, Project No. 297857, 3 pages, printed Apr. 27, 2015.
EWM Virtual Welding Trainer, 2 pages, printed Jan. 14, 2015.
Fillet weld, Wikipedia, 3 pages, printed Feb. 6, 2014.
Fronius, Virtual Welding, 8 pages, printed Jan. 14, 2015.
Fronius, Virtual Welding/The Welder Training of the Future, 8 page brochure, 2011.
International Search Report and Written Opinion from PCT/IB2009/006605 dated Feb. 12, 2010.
International Search Report and Written Opinion from PCT/IB2010/02913 dated Apr. 19, 2011.
Abbas et al., "Code Aster: Introduction to Code Aster," User Manual, Booklet U1.0, Document: U1.02.00; Version 7.4, Jul. 22, 2005.
Abid et al., "Numerical Simulation to study the effect of tack welds and root gap on welding deformations and residual stresses of a pipe flange joint" Intl. J. of Pressure Vessels and Piping, 82, pp. 860-871, 2005.
Agren, "Sensor Integration for Robotic Arc Welding," 1995, vol. 5604C of Dissertations Abstracts International p. 1123, Dissertation Abs Online (Dialog® File 35), ® 2012 ProQuest Info & Learning, http://dialogweb.com/cgi/dwclient?req=1331233317524, one (1) page; printed Mar. 8, 2012.
Aidun et al., "Penetration in Spot GTA Welds during Centrifugation," Journal of Materials Engineering and Performance vol. 7(5), pp. 597-600, Oct. 1998.
ANSI/A WS D 10.11 MID 10. 11 :2007, "Guide for Root Pass Welding of Pipe without Backing Edition," 3rd American Welding Society, ISBN: 0871716445, 6 pages, Oct. 13, 2006.
Antonelli et al., "A Semi-Automated Welding Station Exploiting Human-robot Interaction," Dept. of Production Systems and Economics, pp. 249-260, 2011.
Arc+ simulator, 2 pgs., http://www.123arc.com/en/depliant_ang.pdf, 2000.
asciencetutor.com, A division of Advanced Science and Automation Corp., VWL (Virtual Welding Lab), 2 pages, 2007.
ASME, "Definitions, Consumables, Welding Positions," dated Mar. 19, 2001. See http://www.gowelding.com/wp/asme4.htm.
Balijepalli et al., "A Haptic Based Virtual Grinding Tool", Haptic Interfaces for Virtual Environment and Teleoperator Systems, Haptics 2003, 7, Department of Mechanical & Aerospace Engineering, State University of New York at Buffalo, NY.

(56) References Cited

OTHER PUBLICATIONS

Borzecki et al., Specialist Committee v.3 Fabrication Technology Comittee Mandate, Aug. 20-25, 2006, 49 pages, vol. 2, 16th International Ship and Offshore Structures Congress, Southampton, UK.
ChemWeb.com, "Journal of Materials Engineering and Performance," (v.7, #5), 3 pgs., printed Sep. 26, 2012.
Chen et al., "Self-Learning Fuzzy Neural Networks and Computer Vision for Control of Pulsed GTAW," Welding Research Supplement, pp. 201-209, dated May 1997.
Choquet, "ARC+: Today's Virtual Reality Solution for Welders" Internet Page, 6 pages, Jan. 1, 2008.
Office Action from U.S. Appl. No. 15/077,532 dated Dec. 29, 2017.
Office Action from U.S. Appl. No. 14/827,657 dated Jan. 16, 2018.
Notice of Allowance from U.S. Appl. No. 15/077,532 dated Mar. 28, 2018.
Office Action from CN Application No. 2014800493755 dated Apr. 8, 2018.
Office Action in CN Application No. 201710087175A dated Feb. 1, 2018.
Office Action in JP Application No. 2015-562352 dated Feb. 6, 2018.
Office Action in JP Application No. 2015-562353 dated Feb. 6, 2018.
Office Action in JP Application No. 2015-562354 dated Feb. 6, 2018.
Office Action in JP Application No. 2015-562355 dated Feb. 6, 2018.
Communication Pursuant to Article 94(3) EPC in EP Application No. 14732357.0 dated Feb. 12, 2018.
First Office Action from Japanese Application No. 2016-542390 dated Jun. 5, 2018.
Communication pursuant to Article 94(3) EPC from EP Application No. 15732934.3 dated Apr. 24, 2018.
Communication pursuant to Article 94(3) EPC from EP Application No. 15731664.7 dated Jul. 13, 2018.
Office Action form U.S. Appl. No. 14/190,812 dated Dec. 11, 2018.

* cited by examiner

COURSE WELDING 101     TEACHER TEST   LOGOUT

MY HOME ▷ WELDING 101

YOUR PROGRESS ☐

WELDING COURSE
REALLY COOL BANNER DESCRIPTION

| PRACTICE | GMAW | SMAW | FCAW | PPE |

LESSONS
SHORT ARC ON TEES I
SHORT ARC ON TEES II

GMAW INTRODUCTION
GAS METAL ARC WELDING (GMAW) IS A WELDING PROCESS IN WHICH AN ELECTRIC ARC FORMS BETWEEN A CONSUMABLE WIRE ELECTRODE AND THE WORKPIECE METAL(S), WHICH HEATS THE WORKPIECE METAL(S), CAUSING THEM TO MELT, AND JOIN. ALONG THE WIRE ELECTRODE, A SHIELDING GAS FEEDS THROUGH THE WELDING GUN, WHICH SHIELDS THE PROCESS FROM CONTAMINANTS IN THE AIR. THE PROCESS CAN BE SEMI-AUTOMATIC OR AUTOMATIC. A CONSTANT VOLTAGE, DIRECT CURRENT POWER SOURCE IS MOST COMMONLY USED WITH GMAW, BUT CONSTANT CURRENT SYSTEMS, AS WELL AS ALTERNATING CURRENT, CAN BE USED. THERE ARE THREE PRIMARY METHODS OF METAL TRANSFER IN GMAW: SHORT ARC, PULSE, AXIAL SPRAY

MY CLASSES
⊞ EXISTING CLASSES
☐ CLASS A
○ CLASS B
CLASS DZ
EDIT CLASSES

PREREQUISITES: NONE
PREREQUISITE COMPLETED: YES ☐

▷ SHORT ARC
GMAW - SHORT ARC IS A LOW ENERGY PROCESS WHICH ALSO GENERATES IT'S HEAT FROM AN ELECTRIC ARC. THE REDUCED HEAT INPUT MAKES IT POSSIBLE TO WELD THINNER MATERIALS WHILE DECREASING THE AMOUNT OF DISTORTION AND RESIDUAL STRESS IN THE WELD AREA. THIS TYPE OF METAL TRANSFER PROVIDES BETTER WELD QUALITY AND LESS SPLATTER, AND ALLOWS FOR WELDING IN ALL POSITIONS, ALBEIT WITH SLOWER DEPOSITION OF WELD MATERIAL.

ENROLL STUDENT
⊞ CREATE NEW STUDENT
⊞ ENROLL STUDENT

☐ SHORT ARC ON TEES I
☐ SHORT ARC ON TEES II
VIEW REPORT

▷ PULSE
GMAW-S - PULSE USES A PULSING CURRENT TO MELT THE FILLER WIRE AND ALLOW ON SMALL MOLTEN DROPLET TO FALL WITH EACH PULSE. THE PULSES ALLOW THE AVERAGE CURRENT TO BE LOWER, DECREASING THE OVERALL HEAT INPUT AND THEREBY DECREASING THE SIZE OF THE WELD POOL. THE PULSE PROVIDES A STABLE ARC AND NO SPLATTER, SINCE NO SHORT-CIRCUITING TAKES PLACE. THIS ALSO MAKES THE PROCESS SUITABLE FOR NEARLY ALL METALS AND WELDING POSITIONS.

IMPORT DATA
⇧ UPLOAD STUDENT DATA

▷ AXIAL SPRAY

FIG. 18

LEARNING MANAGEMENT SYSTEM FOR A REAL-TIME SIMULATED VIRTUAL REALITY WELDING TRAINING ENVIRONMENT

RELATED APPLICATION

This is application is a divisional application of U.S. patent application Ser. No. 14/190,812, filed Feb. 26, 2014, titled LEARNING MANAGEMENT SYSTEM FOR A REAL-TIME SIMULATED VIRTUAL REALITY WELDING TRAINING ENVIRONMENT, which claims priority to and any benefit of U.S. Provisional Application No. 61/876,352, filed Sep. 11, 2013, the entire contents of which are incorporated herein by reference in their entirety.

FIELD

Certain embodiments relate to virtual reality simulation and training. More particularly, certain embodiments relate to systems and methods for tracking student progress as students learn how to weld in a real-time, simulated, virtual reality welding training environment.

BACKGROUND

Learning how to arc weld traditionally takes many hours of instruction, training, and practice. There are many different types of arc welding and arc welding processes that can be learned. Typically, welding is learned by a student using a real welding system and performing welding operations on real metal pieces. Such real-world training can tie up scarce welding resources and use up limited welding materials. Recently, however, the idea of training using welding simulations has become more popular. In particular, training in a virtual reality welding environment has gained momentum. A significant amount of data can be generated during a virtual reality welding training session for a student welder. A welding instructor, having multiple students in multiple classes at different levels of training, can find it very challenging to keep track of a student's progress and formulate relevant feedback for that student. Therefore, it is desirable to provide systems and methods to help welding instructors and students manage the data associated with instruction and learning in a virtual reality welding environment.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention provide systems and methods for tracking student progress as students learn how to weld in a real-time, simulated, virtual reality welding training environment and to help welding instructors and students manage the data associated with instruction and learning in a virtual reality welding environment.

One embodiment of the present invention provides a learning management system (LMS). The LMS includes at least one virtual reality welding system configured to generate student training data in response to at least one student performing at least one virtual welding process on the at least one virtual reality welding system, a database server system configured to receive and store the student training data, and a personal computer having a learning management software application (LMSA) installed thereon, wherein the learning management software application (LMSA) includes executable computer instructions configured to execute on the personal computer to perform one or more of: downloading the student training data from the at least one virtual reality welding system to the personal computer in at least one of a wired or wireless manner, uploading the student training data, analyzing results and reports from the personal computer to the database server system via an external communication infrastructure, and downloading the student training data from the database server system to the personal computer via an external communication infrastructure. The learning management system may also include an external communication infrastructure such as, for example, the internet, a cellular telephone communication network, a WiFi communication network, or a satellite communication network. The LMSA may further include executable computer instructions configured to execute on the personal computer to analyze the student training data and generate the analysis results and the reports. The LMSA may further include executable computer instructions configured to execute on the personal computer to generate at least one grade for at least one welding student based on at least a portion of the student training data. The LMSA may further include executable computer instructions configured to execute on the personal computer to identify, based on at least a portion of the student training data, any welding skills that a welding student is having trouble mastering. The LMSA may further include executable computer instructions configured to execute on the personal computer to compare welding performance of two or more welding students based on at least a portion of the student training data. The LMSA may provide instructional welding lessons and materials for welding students and welding instructors. The student training data may include information related to welding parameters including at least one of contact tip to work distance, weld angle, travel angle, and travel speed as affected by a welding student during a virtual welding process. The student training data may include information related to at least one of a welding student name, a date and time of a virtual welding process performed by a welding student, default tolerances used during a virtual welding process, technique parameter scores based on a welding procedure specification (WPS), a welding pass number and a weld score per pass, an average of weld score passes, an overall score, a welding process and technique used, a joint configuration and position, discontinuities and percent, number of welds completed per joint configuration, data for return-on-investment reporting, student arc time, student material usage, student simulator time, and results of virtual reality destructive testing.

One embodiment of the present invention provides a method. The method includes accessing a database server system using a personal computer having a learning management software applications (LMSA) installed thereon, downloading student training data from the database server system to the personal computer using the LMSA, wherein the student training data derives from one or more virtual welding processes performed on one or more virtual reality welding systems, and analyzing the student training data using the LMSA to determine a welding performance of one or more welding students associated with the student training data. The method may further include using the LMSA to do one or more of: selecting graded joint configurations from a list to create a grade book for a class, entering welding projects and assignments, that are not derived directly from a virtual reality welding system, for data manipulation, applying pricing to data to determine cost savings, organizing student data by one or more of class/ period/shift, measuring student improvement between two welding exercises or points in time, generating pass/fail indications based on a cutoff score input by a welding instructor, adding performance comments to a report for a welding student, generating a report card and selecting items to be included or excluded from the report card, generate printable reports by one or more of welding student, welding class, or time frame, archiving final welding class results to the database server system, and creating and tracking virtual certifications as acquired by welding students performing to determined levels on welding exercises. The method may also include using the LMSA to enter real-world welding data generated during a real-world welding process performed by a first student welder using a real-world welding machine, and using the LMSA to compare the real-world welding data to at least a portion of the student training data associated with the first student welder.

These and other features of the claimed invention, as well as details of illustrated embodiments thereof, will be more fully understood from the following description and drawings.

BRIEF DESCRIPTION OF THE DRAWINGS

FIG. 18 illustrates an embodiment of a screen shot of an instructor home page of a learning management software application (LMSA)

DETAILED DESCRIPTION

Initially, an embodiment of a virtual reality arc welding (VRAW) system is described herein to put in context the idea of training in a virtual reality welding environment. Subsequently, a learning management system (LMS) is described herein in the context of collecting data from one or more VRAW systems (or similar virtual reality welding systems) and storing and analyzing the data. The data may be representative of simulated welding operations performed by student welders on the VRAW systems, and analysis of the data may be initiated by a welding instructor, for example, to track student progress and provide proper feedback to a student welder.

Virtual Reality Arc Welding System

An embodiment of the present invention provides one or more virtual reality arc welding (VRAW) systems each having a programmable processor-based subsystem, a spatial tracker operatively connected to the programmable processor-based subsystem, at least one mock welding tool capable of being spatially tracked by the spatial tracker, and at least one display device operatively connected to the programmable processor-based subsystem. The system is capable of simulating, in a virtual reality space, a weld puddle having real-time molten metal fluidity and heat dissipation characteristics. The system is also capable of displaying the simulated weld puddle on the display device in real-time. The real-time molten metal fluidity and heat dissipation characteristics of the simulated weld puddle provide real-time visual feedback to a user of the mock welding tool when displayed, allowing the user to adjust or maintain a welding technique in real-time in response to the real-time visual feedback (i.e., helps the user learn to weld correctly). The displayed weld puddle is representative of a weld puddle that would be formed in the real world based on the user's welding technique and the selected welding process and parameters. By viewing a puddle (e.g., shape, color, slag, size, stacked dimes), a user can modify his technique to make a good weld and determine the type of welding being done. The shape of the puddle is responsive to the movement of the gun or stick. As used herein, the term "real-time" means perceiving and experiencing in time in a simulated environment in the same way that a user would perceive and experience in a real-world welding scenario. Furthermore, the weld puddle is responsive to the effects of the physical environment including gravity, allowing a user to realistically practice welding in various positions including overhead welding and various pipe welding angles (e.g., 1 G, 2 G, 5 G, 6 G). The system is further capable of saving data associated with a simulated virtual reality welding session for a student welder.

Figure 1:
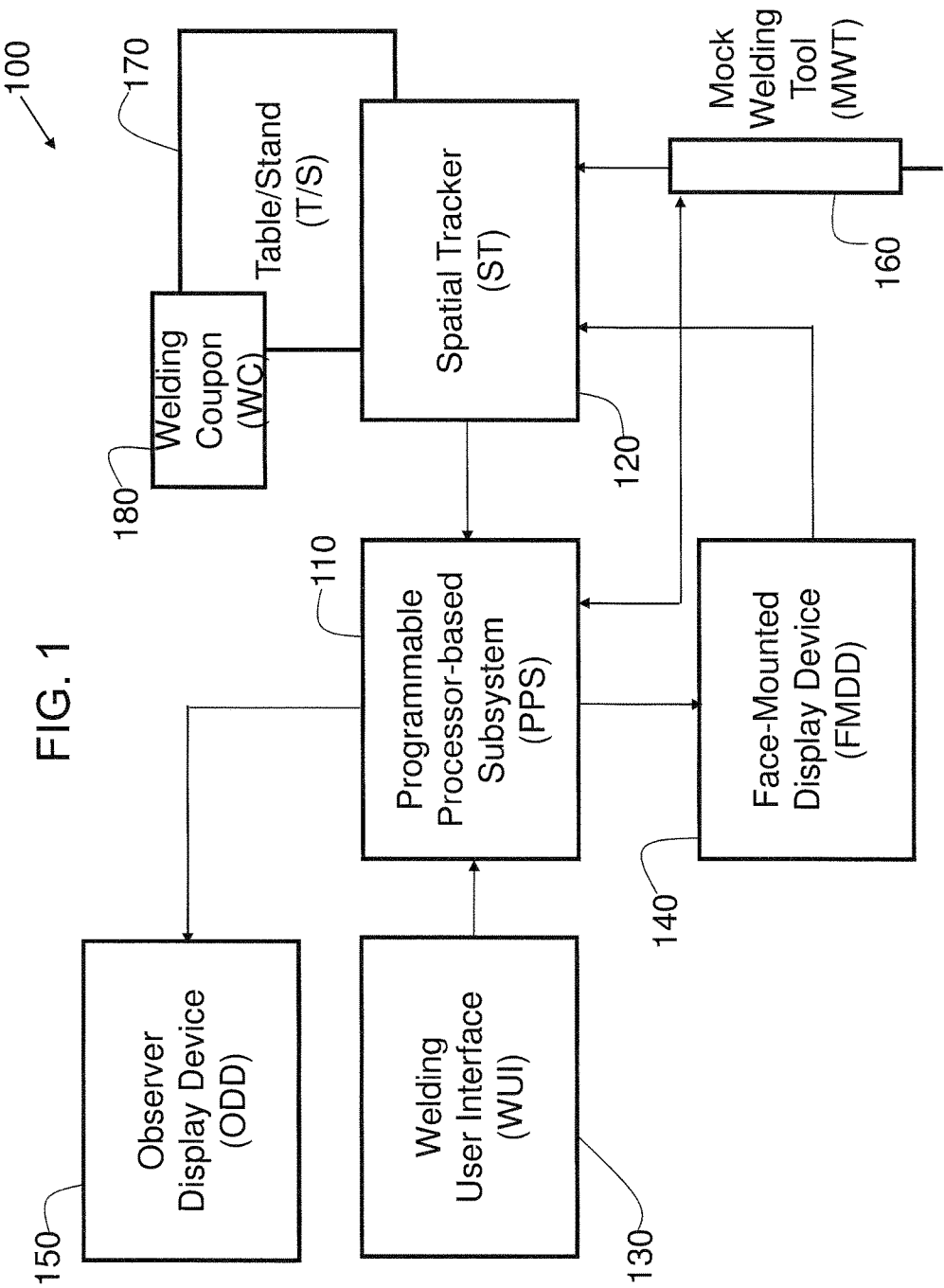
FIG. 1 illustrates an example embodiment of a system block diagram of a system providing arc welding training in a real-time virtual reality environment.

FIG. 1 illustrates an example embodiment of a system block diagram of a system 100 providing arc welding training in a real-time virtual reality environment. The system 100 includes a programmable processor-based subsystem (PPS) 110 having processing units and computer memory. The system 100 further includes a spatial tracker (ST) 120 operatively connected to the PPS 110. The system 100 also includes a physical welding user interface (WUI) 130 operatively connected to the PPS 110 and a face-mounted display device (FMDD) 140 operatively connected to the PPS 110 and the ST 120. The system 100 further includes an observer display device (ODD) 150 operatively connected to the PPS 110. The system 100 also includes at least one mock welding tool (MWT) 160 operatively connected to the ST 120 and the PPS 110. The system 100 further includes a table/stand (T/S) 170 and at least one welding coupon (WC) 180 capable of being attached to the T/S 170. In accordance with an alternative embodiment of the present invention, a mock gas bottle is provided (not shown) simulating a source of shielding gas and having an adjustable flow regulator.

Figure 2:
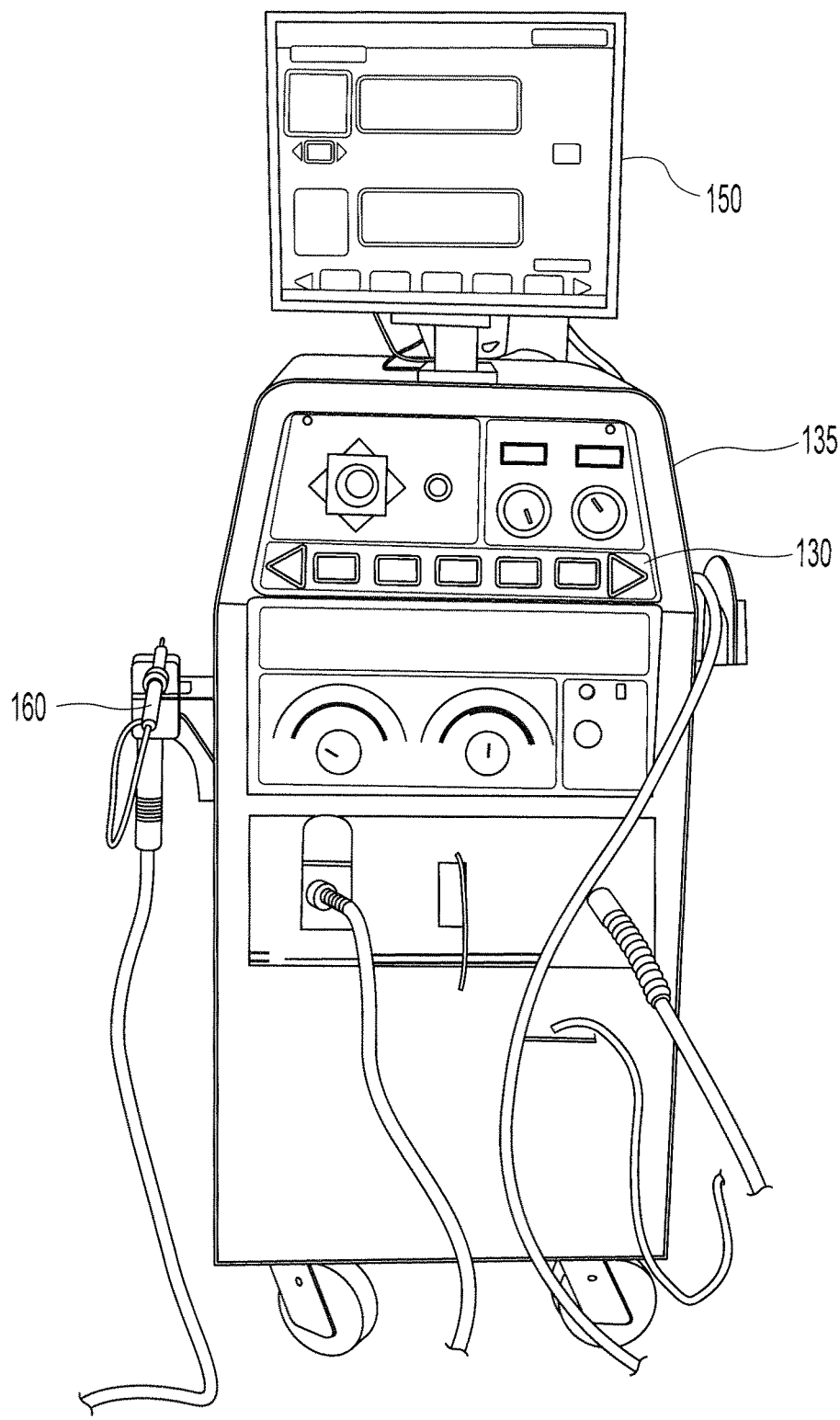
FIG. 2 illustrates an example embodiment of a combined simulated welding console and observer display device (ODD) of the system of FIG. 1.

FIG. 2 illustrates an example embodiment of a combined simulated welding console 135 (simulating a welding power source user interface) and observer display device (ODD) 150 of the system 100 of FIG. 1. The physical WUI 130 resides on a front portion of the console 135 and provides knobs, buttons, and a joystick for user selection of various modes and functions. The ODD 150 is attached to a top portion of the console 135. The MWT 160 rests in a holder attached to a side portion of the console 135. Internally, the console 135 holds the PPS 110 and a portion of the ST 120. In accordance with an alternative embodiment, the selection of the modes and functions provided by the WUI 130 may be in the form of a touch-screen display.

Figure 3:
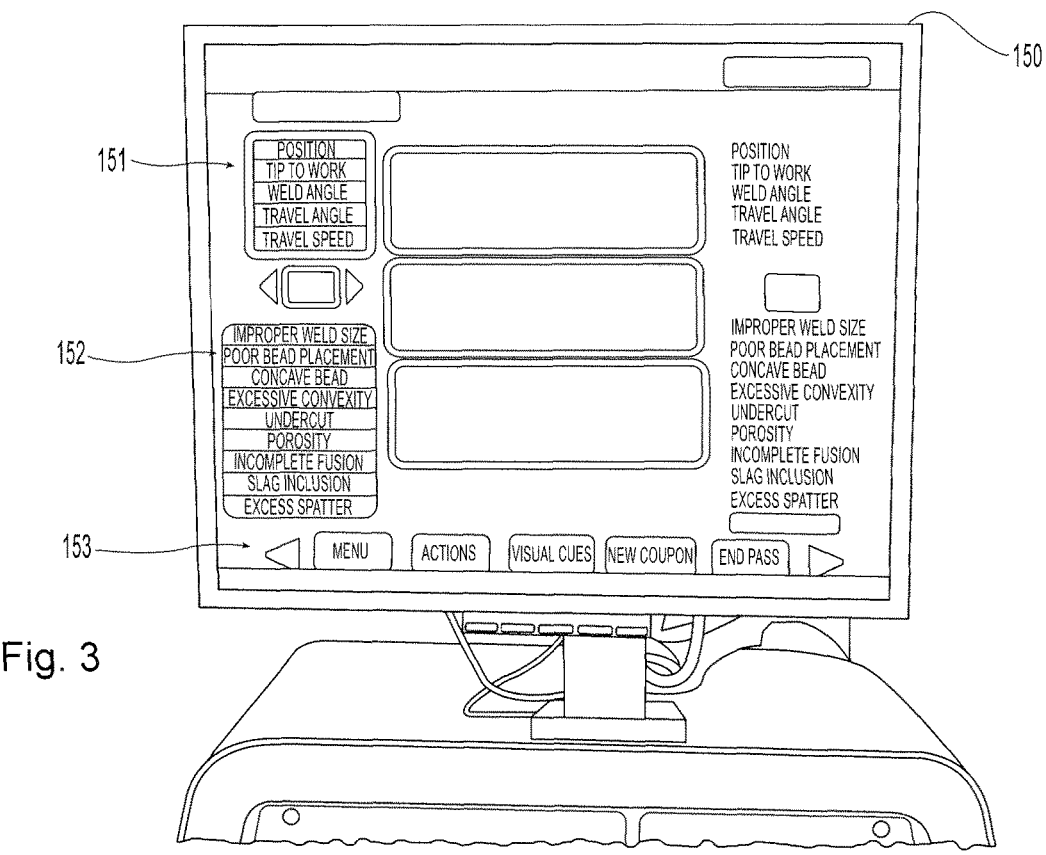
FIG. 3 illustrates an example embodiment of the observer display device (ODD) of FIG. 2.

FIG. 3 illustrates an example embodiment of the observer display device (ODD) 150 of FIG. 2. In accordance with an embodiment of the present invention, the ODD 150 is a liquid crystal display (LCD) device. Other display devices are possible as well. For example, the ODD 150 may be a touchscreen display, in accordance with another embodiment of the present invention. The ODD 150 receives video (e.g., SVGA format) and display information from the PPS 110.

As shown in FIG. 3, the ODD 150 is capable of displaying a first user scene showing various welding parameters 151 including position, tip to work, weld angle, travel angle, and travel speed. These parameters may be selected and displayed in real time in graphical form and are used to teach proper welding technique. Furthermore, as shown in FIG. 3, the ODD 150 is capable of displaying simulated welding discontinuity states 152 including, for example, improper weld size, poor bead placement, concave bead, excessive convexity, undercut, porosity, incomplete fusion, slag inclusion, excess spatter, overfill, and burnthrough (melt through). Undercut is a groove melted into the base metal adjacent to the weld or weld root and left unfilled by weld metal. Undercut is often due to an incorrect angle of welding. Porosity is cavity type discontinuities formed by gas entrapment during solidification often caused by moving the arc too far away from the coupon. Data associated with the parameters and states may be stored on the VRAW system for student welders.

Also, as shown in FIG. 3, the ODD 50 is capable of displaying user selections 153 including menu, actions, visual cues, new coupon, and end pass. These user selections are tied to user buttons on the console 135. As a user makes various selections via, for example, a touchscreen of the ODD 150 or via the physical WUI 130, the displayed characteristics can change to provide selected information and other options to the user. Furthermore, the ODD 150 may display a view seen by a welder wearing the FMDD 140 at the same angular view of the welder or at various different angles, for example, chosen by an instructor. The ODD 150 may be viewed by an instructor and/or students for various training purposes. For example, the view may be rotated around the finished weld allowing visual inspection by an instructor. In accordance with an alternate embodiment of the present invention, video from the system 100 may be sent to a remote location via, for example, the Internet for remote viewing and/or critiquing. Furthermore, audio may be provided, allowing real-time audio communication between a student and a remote instructor.

Figure 4:
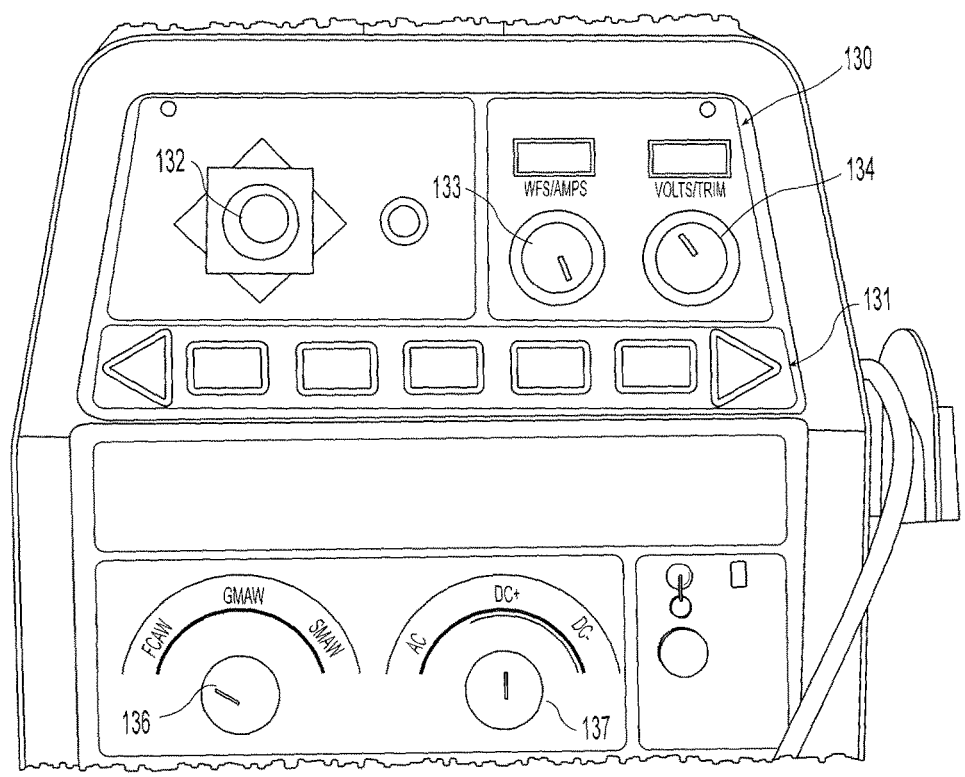
FIG. 4 illustrates an example embodiment of a front portion of the simulated welding console of FIG. 2 showing a physical welding user interface (WUI)

FIG. 4 illustrates an example embodiment of a front portion of the simulated welding console 135 of FIG. 2 showing a physical welding user interface (WUI) 130. The WUI 130 includes a set of buttons 131 corresponding to the user selections 153 displayed on the ODD 150. The buttons 131 are colored to correspond to the colors of the user selections 153 displayed on the ODD 150. When one of the buttons 131 is pressed, a signal is sent to the PPS 110 to activate the corresponding function. The WUI 130 also includes a joystick 132 capable of being used by a user to select various parameters and selections displayed on the ODD 150. The WUI 130 further includes a dial or knob 133 for adjusting wire feed speed/amps, and another dial or knob 134 for adjusting volts/trim. The WUI 130 also includes a dial or knob 136 for selecting an arc welding process. In accordance with an embodiment of the present invention, three arc welding processes are selectable including flux cored arc welding (FCAW) including gas-shielded and self-shielded processes; gas metal arc welding (GMAW) including short arc, axial spray, STT, and pulse; gas tungsten arc welding (GTAW); and shielded metal arc welding (SMAW) including E6010 and E7010 electrodes. The WUI 130 further includes a dial or knob 137 for selecting a welding polarity. In accordance with an embodiment of the present invention, three arc welding polarities are selectable including alternating current (AC), positive direct current (DC+), and negative direct current (DC−).

Figure 5:
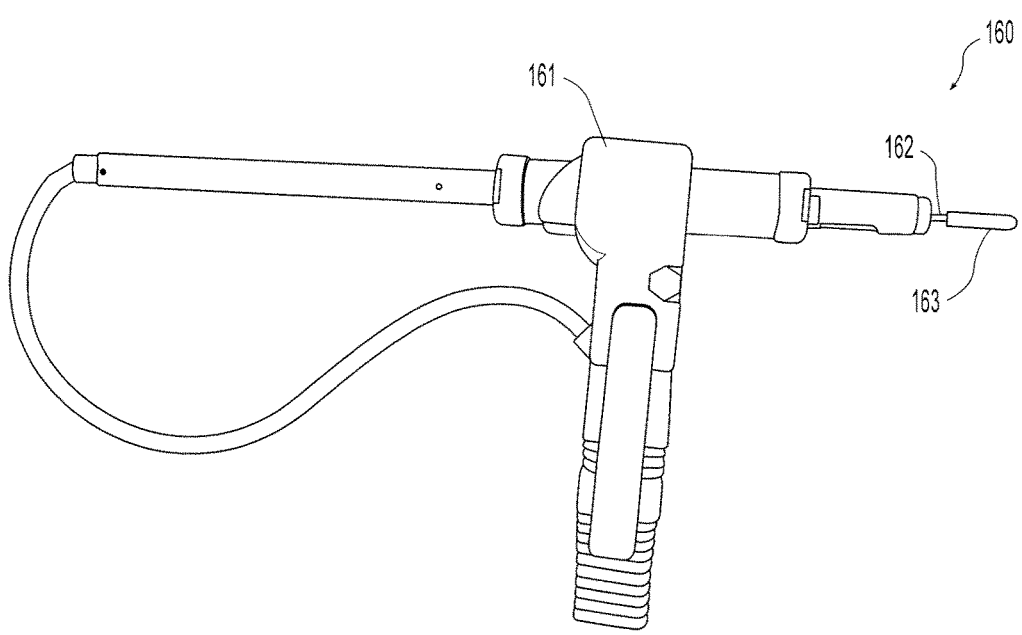
FIG. 5 illustrates an example embodiment of a mock welding tool (MWT) of the system of FIG. 1.

FIG. 5 illustrates an example embodiment of a mock welding tool (MWT) 160 of the system 100 of FIG. 1. The MWT 160 of FIG. 5 simulates a stick welding tool for plate and pipe welding and includes a holder 161 and a simulated stick electrode 162. A trigger on the MWD 160 is used to communicate a signal to the PPS 110 to activate a selected simulated welding process. The simulated stick electrode 162 includes a tactilely resistive tip 163 to simulate resistive feedback that occurs during, for example, a root pass welding procedure in real-world pipe welding or when welding a plate. If the user moves the simulated stick electrode 162 too far back out of the root, the user will be able to feel or sense the lower resistance, thereby deriving feedback for use in adjusting or maintaining the current welding process.

It is contemplated that the stick welding tool may incorporate an actuator, not shown, that withdraws the simulated stick electrode 162 during the virtual welding process. That is to say that as a user engages in virtual welding activity, the distance between the holder 161 and the tip of the simulated stick electrode 162 is reduced to simulate consumption of the electrode. The consumption rate, i.e. withdrawal of the stick electrode 162, may be controlled by the PPS 110 and more specifically by coded instructions executed by the PPS 110. The simulated consumption rate may also depend on the user's technique. It is noteworthy to mention here that as the system 100 facilitates virtual welding with different types of electrodes, the consumption rate or reduction of the stick electrode 162 may change with the welding procedure used and/or setup of the system 100.

Other mock welding tools are possible as well, in accordance with other embodiments of the present invention, including a MWD that simulates a hand-held semi-automatic welding gun having a wire electrode fed through the gun, for example. Furthermore, in accordance with other certain embodiments of the present invention, a real welding tool could be used as the MWT 160 to better simulate the actual feel of the tool in the user's hands, even though, in the system 100, the tool would not be used to actually create a real arc. Also, a simulated grinding tool may be provided, for use in a simulated grinding mode of the simulator 100. Similarly, a simulated cutting tool may be provided, for use in a simulated cutting mode of the simulator 100. Furthermore, a simulated gas tungsten arc welding (GTAW) torch or filler material may be provided for use in the simulator 100.

Figure 6:
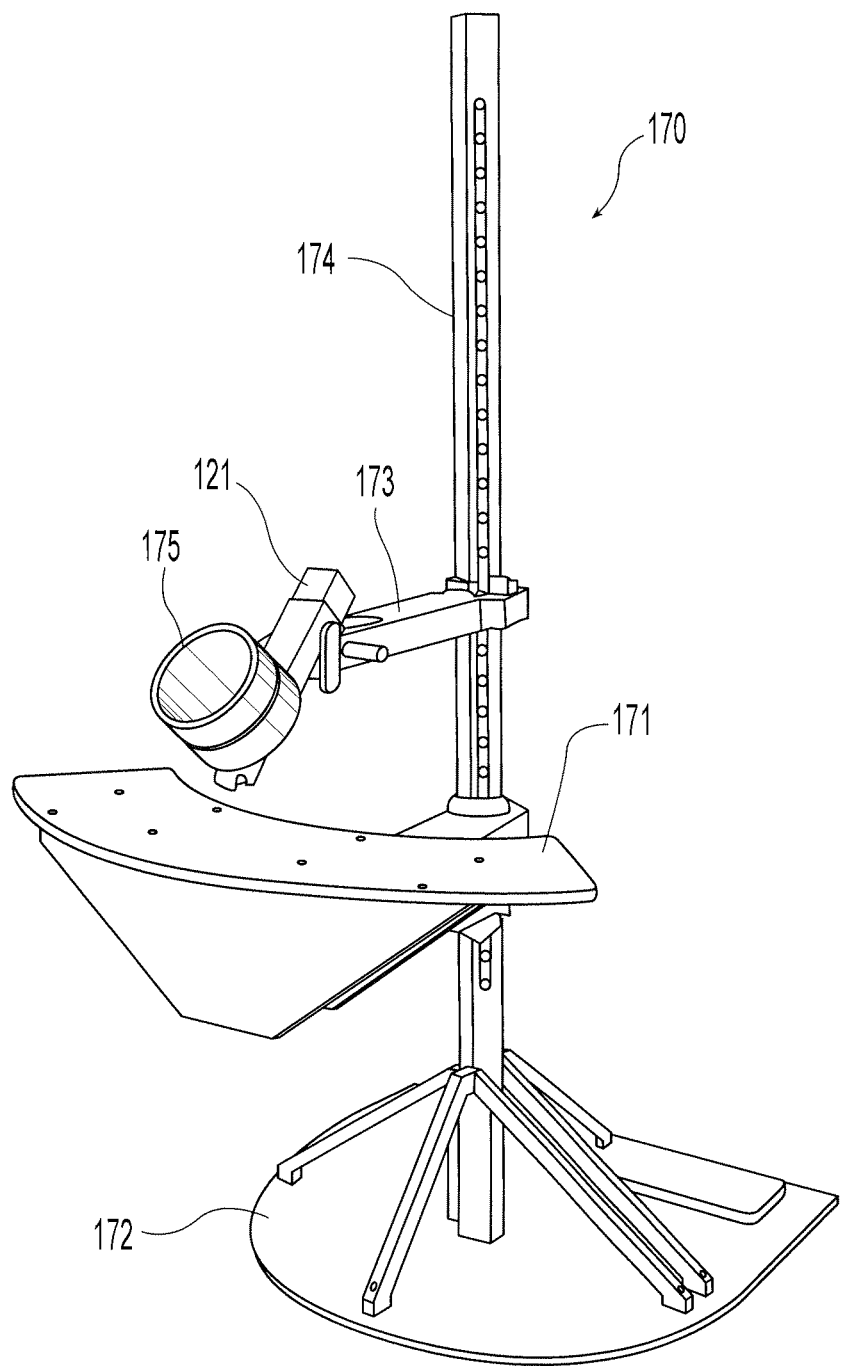
FIG. 6 illustrates an example embodiment of a table/stand (T/S) of the system of FIG. 1.

FIG. 6 illustrates an example embodiment of a table/stand (T/S) 170 of the system 100 of FIG. 1. The T/S 170 includes an adjustable table 171, a stand or base 172, an adjustable arm 173, and a vertical post 174. The table 171, the stand 172, and the arm 173 are each attached to the vertical post 174. The table 171 and the arm 173 are each capable of being manually adjusted upward, downward, and rotationally with respect to the vertical post 174. The arm 173 is used to hold various welding coupons (e.g., welding coupon 175) and a user may rest his/her arm on the table 171 when training. The vertical post 174 is indexed with position information such that a user may know exactly where the arm 173 and the table 171 are vertically positioned on the post 171. This vertical position information may be entered into the system by a user using the WUI 130 and the ODD 150.

In accordance with an alternative embodiment of the present invention, the positions of the table 171 and the arm 173 may be automatically set by the PSS 110 via preprogrammed settings, or via the WUI 130 and/or the ODD 150 as commanded by a user. In such an alternative embodiment, the T/S 170 includes, for example, motors and/or servo-mechanisms, and signal commands from the PPS 110 activate the motors and/or servo-mechanisms. In accordance with a further alternative embodiment of the present invention, the positions of the table 171 and the arm 173 and the type of coupon are detected by the system 100. In this way, a user does not have to manually input the position information via the user interface. In such an alternative embodiment, the T/S 170 includes position and orientation detectors and sends signal commands to the PPS 110 to provide position and orientation information, and the WC 175 includes position detecting sensors (e.g., coiled sensors for detecting magnetic fields). A user is able to see a rendering of the T/S 170 adjustment on the ODD 150 as the adjustment parameters are changed, in accordance with an embodiment of the present invention.

Figures 7A, 7B:
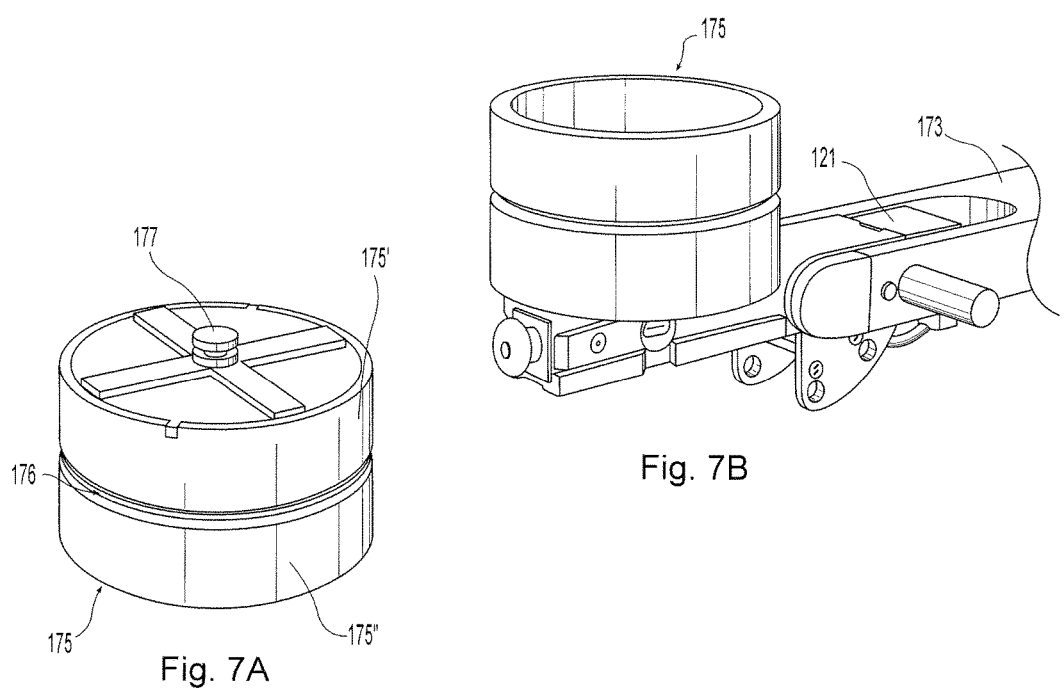
FIG. 7A illustrates an example embodiment of a pipe welding coupon (WC) of the system of FIG. 1.
FIG. 7B illustrates the pipe WC of FIG. 7A mounted in an arm of the table/stand (TS) of FIG. 6.

FIG. 7A illustrates an example embodiment of a pipe welding coupon (WC) 175 of the system 100 of FIG. 1. The WC 175 simulates two six inch diameter pipes 175' and 175" placed together to form a root 176 to be welded. The WC 175 includes a connection portion 177 at one end of the WC 175, allowing the WC 175 to be attached in a precise and repeatable manner to the arm 173. FIG. 7B illustrates the pipe WC 175 of FIG. 7A mounted on the arm 173 of the table/stand (TS) 170 of FIG. 6. The precise and repeatable manner in which the WC 175 is capable of being attached to the arm 173 allows spatial calibration of the WC 175 to be performed only once at the factory. Then, in the field, as long as the system 100 is told the position of the arm 173, the system 100 is able to track the MWT 160 and the FMDD 140 with respect to the WC 175 in a virtual environment. A first portion of the arm 173, to which the WC 175 is attached, is capable of being tilted with respect to a second portion of the arm 173, as shown in FIG. 6. This allows the user to practice pipe welding with the pipe in any of several different orientations and angles.

Figure 8:
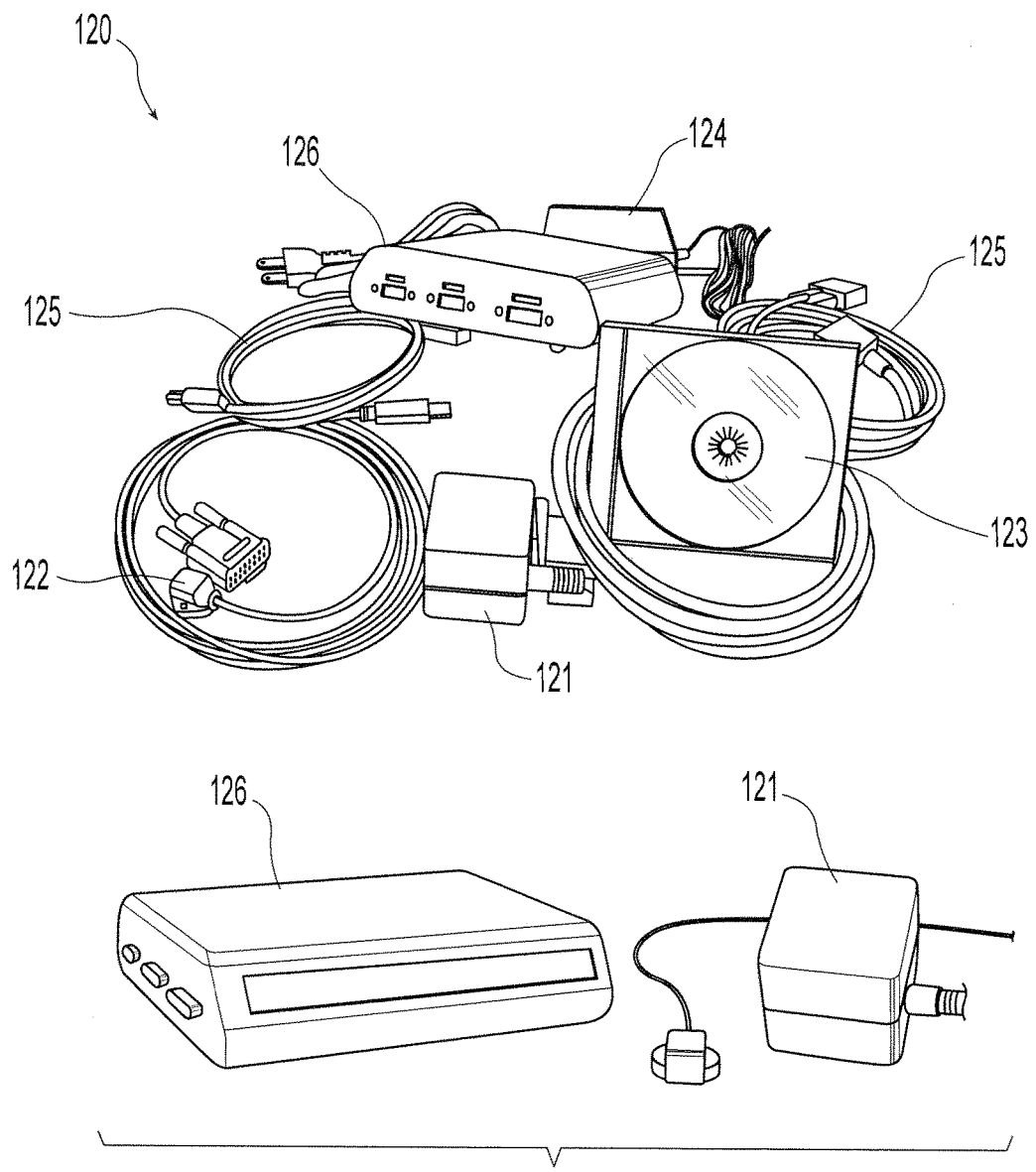
FIG. 8 illustrates various elements of an example embodiment of the spatial tracker (ST) of FIG. 1.

FIG. 8 illustrates various elements of an example embodiment of the spatial tracker (ST) 120 of FIG. 1. The ST 120 is a magnetic tracker that is capable of operatively interfacing with the PPS 110 of the system 100. The ST 120 includes a magnetic source 121 and source cable, at least one sensor 122 and associated cable, host software on disk 123, a power source 124 and associated cable, USB and RS-232 cables 125, and a processor tracking unit 126. The magnetic source 121 is capable of being operatively connected to the processor tracking unit 126 via a cable. The sensor 122 is capable of being operatively connected to the processor tracking unit 126 via a cable. The power source 124 is capable of being operatively connected to the processor tracking unit 126 via a cable. The processor tracking unit 126 is cable of being operatively connected to the PPS 110 via a USB or RS-232 cable 125. The host software on disk 123 is capable of being loaded onto the PPS 110 and allows functional communication between the ST 120 and the PPS 110.

Referring to FIG. 6, the magnetic source 121 of the ST 120 is mounted on the first portion of the arm 173. The magnetic source 121 creates a magnetic field around the source 121, including the space encompassing the WC 175 attached to the arm 173, which establishes a 3D spatial frame of reference. The T/S 170 is largely non-metallic (non-ferric and non-conductive) so as not to distort the magnetic field created by the magnetic source 121. The sensor 122 includes three induction coils orthogonally aligned along three spatial directions. The induction coils of the sensor 122 each measure the strength of the magnetic field in each of the three directions and provide that information to the processor tracking unit 126. As a result, the system 100 is able to know where any portion of the WC 175 is with respect to the 3D spatial frame of reference established by the magnetic field when the WC 175 is mounted on the arm 173. The sensor 122 may be attached to the MWT 160 or to the FMDD 140, allowing the MWT 160 or the FMDD 140 to be tracked by the ST 120 with respect to the 3D spatial frame of reference in both space and orientation. When two sensors 122 are provided and operatively connected to the processor tracking unit 126, both the MWT 160 and the FMDD 140 may be tracked. In this manner, the system 100 is capable of creating a virtual WC, a virtual MWT, and a virtual T/S in virtual reality space and displaying the virtual WC, the virtual MWT, and the virtual T/S on the FMDD 140 and/or the ODD 150 as the MWT 160 and the FMDD 140 are tracked with respect to the 3D spatial frame of reference.

In accordance with an alternative embodiment of the present invention, the sensor(s) 122 may wirelessly interface to the processor tracking unit 126, and the processor tracking unit 126 may wirelessly interface to the PPS 110. In accordance with other alternative embodiments of the present invention, other types of spatial trackers 120 may be used in the system 100 including, for example, an accelerometer/gyroscope-based tracker, an optical tracker (active or passive), an infrared tracker, an acoustic tracker, a laser tracker, a radio frequency tracker, an inertial tracker, and augmented reality based tracking systems. Other types of trackers may be possible as well.

Figure 9A:
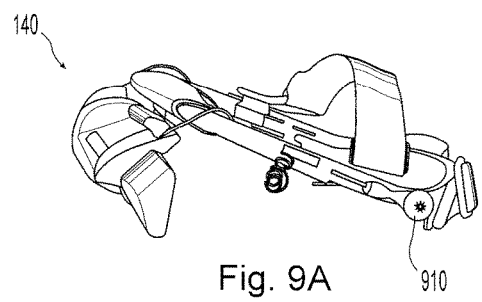
FIG. 9A illustrates an example embodiment of a face-mounted display device (FMDD) of the system of FIG. 1.
Figure 9B:
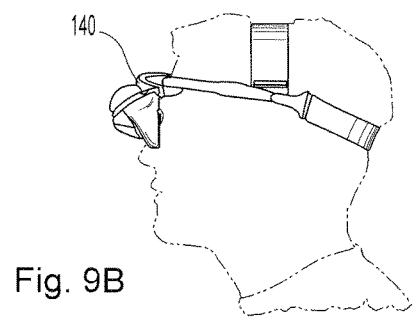
FIG. 9B is an illustration of how the FMDD of FIG. 9A is secured on the head of a user.
Figure 9C:
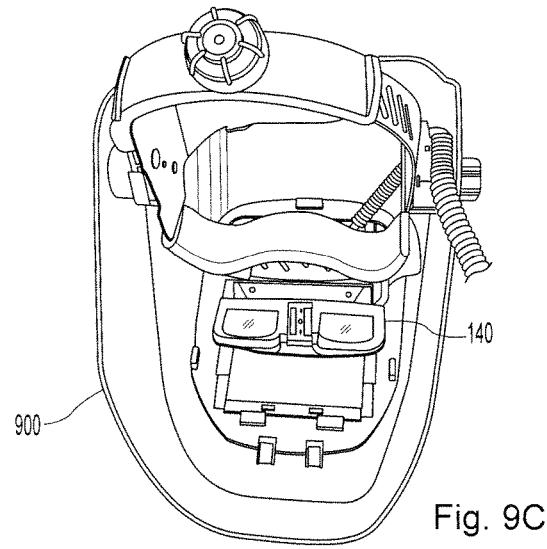
FIG. 9C illustrates an example embodiment of the FMDD of FIG. 9A mounted within a welding helmet.

FIG. 9A illustrates an example embodiment of the face-mounted display device 140 (FMDD) of the system 100 of FIG. 1. FIG. 9B is an illustration of how the FMDD 140 of FIG. 9A is secured on the head of a user. FIG. 9C illustrates an example embodiment of the FMDD 140 of FIG. 9A integrated into a welding helmet 900. The FMDD 140 operatively connects to the PPS 110 and the ST 120 either via wired means or wirelessly. A sensor 122 of the ST 120 may be attached to the FMDD 140 or to the welding helmet 900, in accordance with various embodiments of the present invention, allowing the FMDD 140 and/or welding helmet 900 to be tracked with respect to the 3D spatial frame of reference created by the ST 120.

In accordance with an embodiment of the present invention, the FMDD 140 includes two high-contrast SVGA 3D OLED microdisplays capable of delivering fluid full-motion video in the 2D and frame sequential video modes. Video of the virtual reality environment is provided and displayed on the FMDD 140. A zoom (e.g., 2×) mode may be provided, allowing a user to simulate a cheater lens, for example.

The FMDD 140 further includes two earbud speakers 910, allowing the user to hear simulated welding-related and environmental sounds produced by the system 100. The FMDD 140 may operatively interface to the PPS 110 via wired or wireless means, in accordance with various embodiments of the present invention. In accordance with an embodiment of the present invention, the PPS 110 provides stereoscopic video to the FMDD 140, providing enhanced depth perception to the user. In accordance with an alternate embodiment of the present invention, a user is able to use a control on the MWT 160 (e.g., a button or switch) to call up and select menus and display options on the FMDD 140. This may allow the user to easily reset a weld if he makes a mistake, change certain parameters, or back up a little to re-do a portion of a weld bead trajectory, for example.

Figure 10:
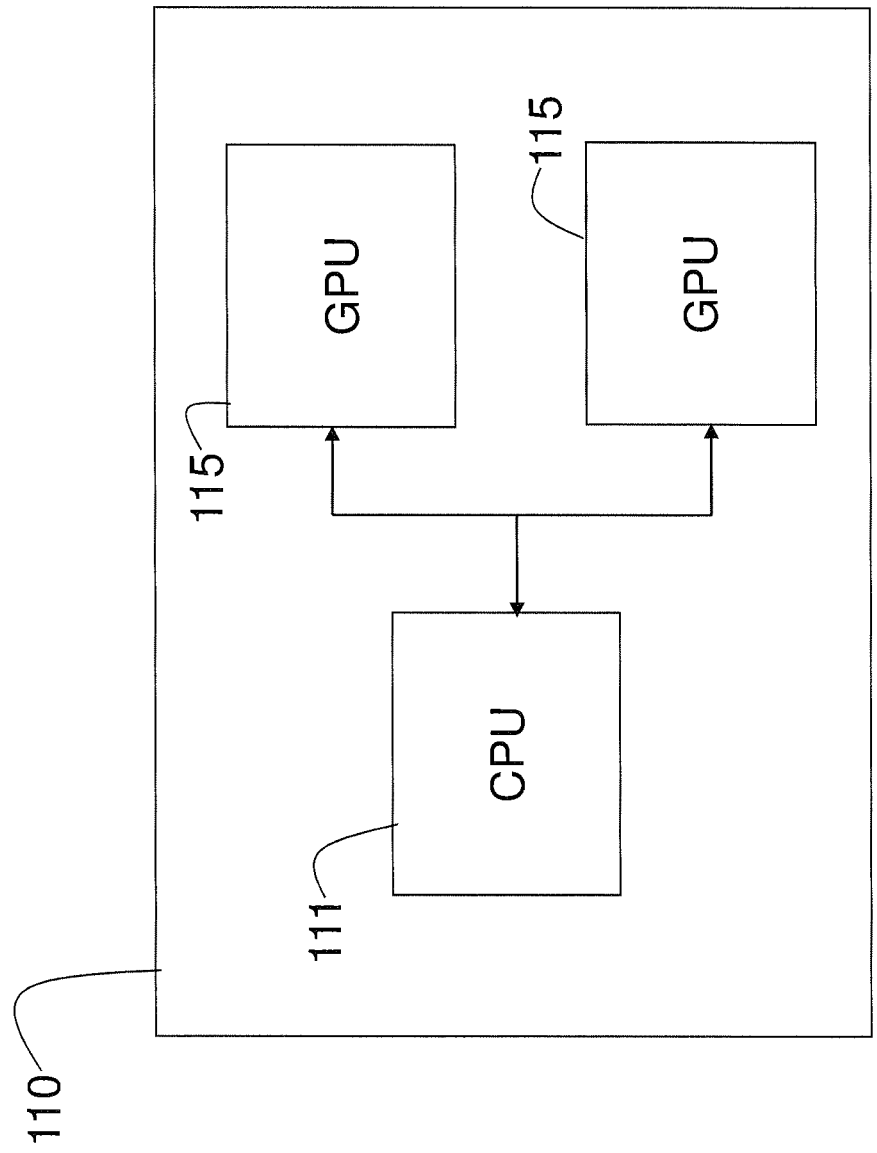
FIG. 10 illustrates an example embodiment of a subsystem block diagram of a programmable processor-based subsystem (PPS) of the system of FIG. 1.

FIG. 10 illustrates an example embodiment of a subsystem block diagram of the programmable processor-based subsystem (PPS) 110 of the system 100 of FIG. 1. The PPS 110 includes a central processing unit (CPU) 111 and two graphics processing units (GPU) 115, in accordance with an embodiment of the present invention. The two GPUs 115 are programmed to provide virtual reality simulation of a weld puddle (a.k.a. a weld pool) having real-time molten metal fluidity and heat absorption and dissipation characteristics, in accordance with an embodiment of the present invention.

Figure 11:
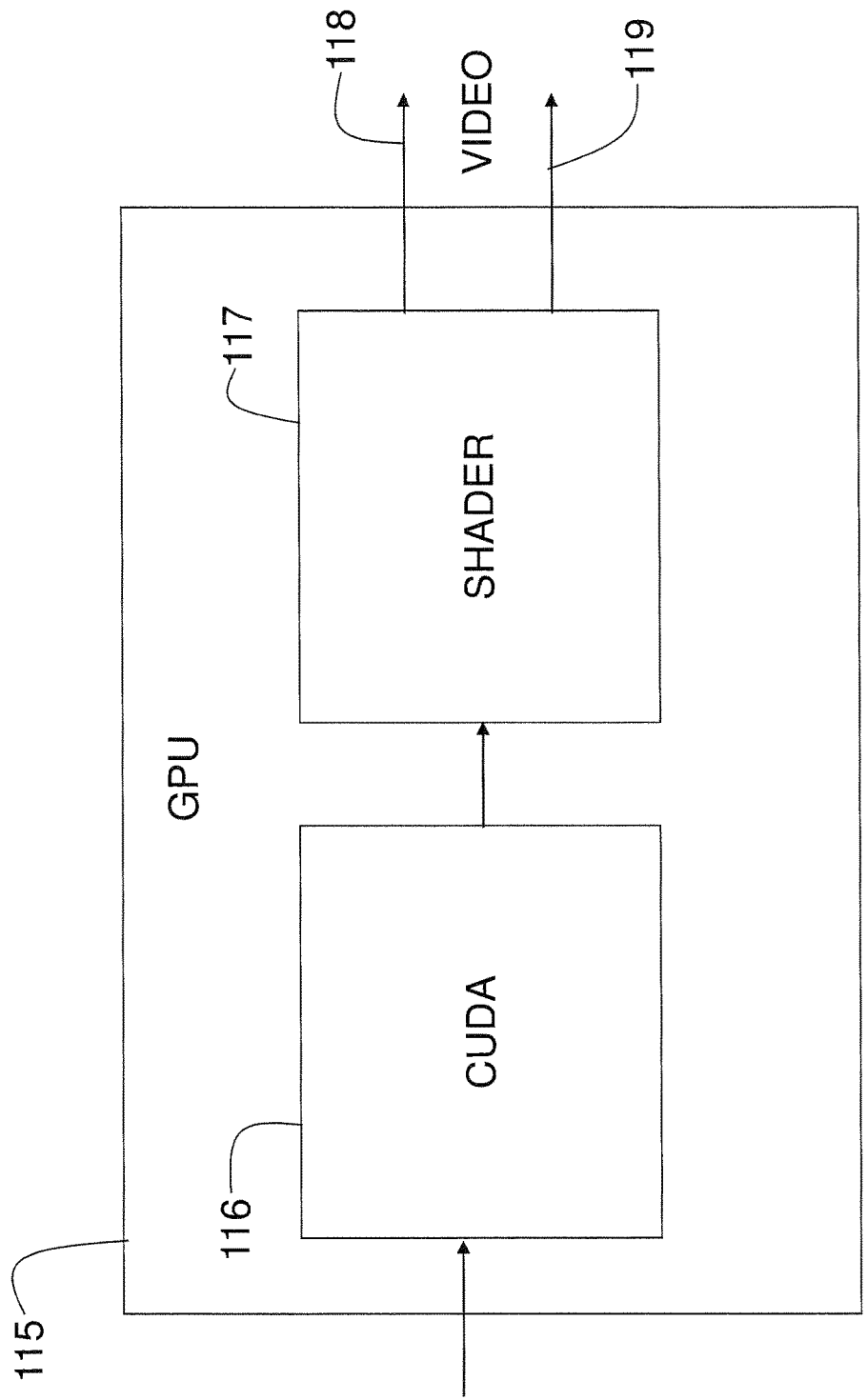
FIG. 11 illustrates an example embodiment of a block diagram of a graphics processing unit (GPU) of the PPS of FIG. 10.

FIG. 11 illustrates an example embodiment of a block diagram of a graphics processing unit (GPU) 115 of the PPS 110 of FIG. 10. Each GPU 115 supports the implementation of data parallel algorithms. In accordance with an embodiment of the present invention, each GPU 115 provides two video outputs 118 and 119 capable of providing two virtual reality views. Two of the video outputs may be routed to the FMDD 140, rendering the welder's point of view, and a third video output may be routed to the ODD 150, for example, rendering either the welder's point of view or some other point of view. The remaining fourth video output may be routed to a projector, for example. Both GPUs 115 perform the same welding physics computations but may render the virtual reality environment from the same or different points of view. The GPU 115 includes a compute unified device architecture (CUDA) 116 and a shader 117. The CUDA 116 is the computing engine of the GPU 115 which is accessible to software developers through industry standard programming languages. The CUDA 116 includes parallel cores and is used to run the physics model of the weld puddle simulation described herein. The CPU 111 provides real-time welding input data to the CUDA 116 on the GPU 115. The shader 117 is responsible for drawing and applying all of the visuals of the simulation. Bead and puddle visuals are driven by the state of a wexel displacement map which is described later herein. In accordance with an embodiment of the present invention, the physics model runs and updates at a rate of about 30 times per second.

Figure 12:
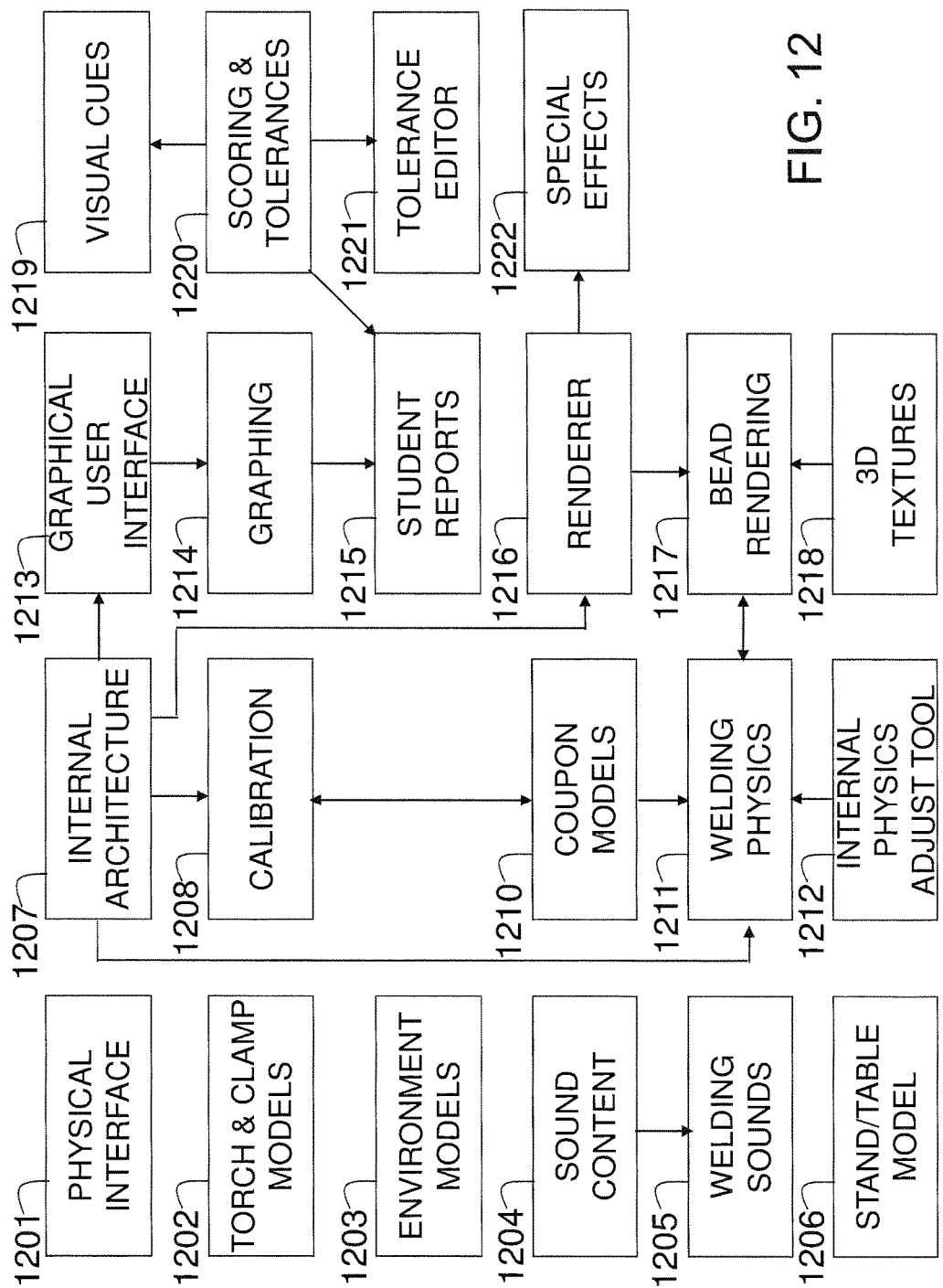
FIG. 12 illustrates an example embodiment of a functional block diagram of the system of FIG. 1.

FIG. 12 illustrates an example embodiment of a functional block diagram of the system 100 of FIG. 1. The various functional blocks of the system 100 as shown in FIG. 12 are implemented largely via software instructions and modules running on the PPS 110. The various functional blocks of the system 100 include a physical interface 1201, torch and clamp models 1202, environment models 1203, sound content functionality 1204, welding sounds 1205, stand/table model 1206, internal architecture functionality 1207, calibration functionality 1208, coupon models 1210, welding physics 1211, internal physics adjustment tool (tweaker) 1212, graphical user interface functionality 1213, graphing functionality 1214, student reports functionality 1215, renderer 1216, bead rendering 1217, 3D textures 1218, visual cues functionality 1219, scoring and tolerance functionality 1220, tolerance editor 1221, and special effects 1222.

The internal architecture functionality 1207 provides the higher level software logistics of the processes of the system 100 including, for example, loading files, holding information, managing threads, turning the physics model on, and triggering menus. The internal architecture functionality 1207 runs on the CPU 111, in accordance with an embodiment of the present invention. Certain real-time inputs to the PPS 110 include arc location, gun position, FMDD or helmet position, gun on/off state, and contact made state (yes/no).

The graphical user interface functionality 1213 allows a user, through the ODD 150 using the joystick 132 of the physical user interface 130, to set up a welding scenario. In accordance with an embodiment of the present invention, the set up of a welding scenario includes selecting a language, entering a user name, selecting a practice plate (i.e., a welding coupon), selecting a welding process (e.g., FCAW, GMAW, SMAW) and associated axial spray, pulse, or short arc methods, selecting a gas type and flow rate, selecting a type of stick electrode (e.g., 6010 or 7018), and selecting a type of flux cored wire (e.g., self-shielded, gas-shielded). The set up of a welding scenario also includes selecting a table height, an arm height, an arm position, and an arm rotation of the T/S 170. The set up of a welding scenario further includes selecting an environment (e.g., a background environment in virtual reality space), setting a wire feed speed, setting a voltage level, setting an amperage, selecting a polarity, and turning particular visual cues on or off.

During a simulated welding scenario, the graphing functionality 1214 gathers user performance parameters and provides the user performance parameters to the graphical user interface functionality 1213 for display in a graphical format (e.g., on the ODD 150). Tracking information from the ST 120 feeds into the graphing functionality 1214. The graphing functionality 1214 includes a simple analysis module (SAM) and a whip/weave analysis module (WWAM). The SAM analyzes user welding parameters including welding travel angle, travel speed, weld angle, position, and tip to work distance by comparing the welding parameters to data stored in bead tables. The WWAM analyzes user whipping parameters including dime spacing, whip time, and puddle time. The WWAM also analyzes user weaving parameters including width of weave, weave spacing, and weave timing. The SAM and WWAM interpret raw input data (e.g., position and orientation data) into functionally usable data for graphing. For each parameter analyzed by the SAM and the WWAM, a tolerance window is defined by parameter limits around an optimum or ideal set point input into bead tables using the tolerance editor 1221, and scoring and tolerance functionality 1220 is performed. Various types of student training data such as, for example, parameter data and scoring data may be stored on the VRAW system and may be used later with respect to a learning management system (LMS) as described later herein.

The tolerance editor 1221 includes a weldometer which approximates material usage, electrical usage, and welding time. Furthermore, when certain parameters are out of tolerance, welding discontinuities (i.e., welding defects) may occur. The state of any welding discontinuities are processed by the graphing functionality 1214 and presented via the graphical user interface functionality 1213 in a graphical format. Such welding discontinuities include improper weld size, poor bead placement, concave bead, excessive convexity, undercut, porosity, incomplete fusion, slag entrapment, overfill, burnthrough, and excessive spatter. In accordance with an embodiment of the present invention, the level or amount of a discontinuity is dependent on how far away a particular user parameter is from the optimum or ideal set point.

Different parameter limits may be pre-defined for different types of users such as, for example, welding novices, welding experts, and persons at a trade show. The scoring and tolerance functionality 1220 provide number scores depending on how close to optimum (ideal) a user is for a particular parameter and depending on the level of discontinuities or defects present in the weld. The optimum values are derived from real-world data. Information from the scoring and tolerance functionality 1220 and from the graphics functionality 1214 may be used by the student reports functionality 1215 to create a performance report for an instructor and/or a student.

The system 100 is capable of analyzing and displaying the results of virtual welding activity. By analyzing the results, it is meant that system 100 is capable of determining when during the welding pass and where along the weld joints the user deviated from the acceptable limits of the welding process. A score may be attributed to the user's performance. In one embodiment, the score may be a function of deviation in position, orientation, and speed of the mock welding tool 160 through ranges of tolerances, which may extend from an ideal welding pass to marginal or unacceptable welding activity. Any gradient of ranges may be incorporated into the system 100 as chosen for scoring the user's performance. Scoring may be displayed numerically or alpha-numerically. Additionally, the user's performance may be displayed graphically showing, in time and/or position along the weld joint, how closely the mock welding tool traversed the weld joint. Parameters such as travel angle, work angle, speed, and distance from the weld joint are examples of what may be measured, although any parameters may be analyzed for scoring purposes. The tolerance ranges of the parameters are taken from real-world welding data, thereby providing accurate feedback as to how the user will perform in the real world. In another embodiment, analysis of the defects corresponding to the user's performance may also be incorporated and displayed on the ODD 150. In this embodiment, a graph may be depicted indicating what type of discontinuity resulted from measuring the various parameters monitored during the virtual welding activity. While occlusions may not be visible on the ODD 150, defects may still have occurred as a result of the user's performance, the results of which may still be correspondingly displayed, i.e., graphed. Again, various types of student training data such as, for example, parameter data and scoring data may be stored on the VRAW system and may be used later with respect to a learning management system (LMS) as described later herein.

Visual cues functionality 1219 provide immediate feedback to the user by displaying overlaid colors and indicators on the FMDD 140 and/or the ODD 150. Visual cues are provided for each of the welding parameters 151 including position, tip to work distance, weld angle, travel angle, travel speed, and arc length (e.g., for stick welding) and visually indicate to the user if some aspect of the user's welding technique should be adjusted based on the predefined limits or tolerances. Visual cues may also be provided for whip/weave technique and weld bead "dime" spacing, for example. Visual cues may be set independently or in any desired combination.

Calibration functionality 1208 provides the capability to match up physical components in real-world space (3D frame of reference) with visual components in virtual reality space. Each different type of welding coupon (WC) is calibrated in the factory by mounting the WC to the arm 173 of the T/S 170 and touching the WC at predefined points (indicated by, for example, three dimples on the WC) with a calibration stylus operatively connected to the ST 120. The ST 120 reads the magnetic field intensities at the predefined points, provides position information to the PPS 110, and the PPS 110 uses the position information to perform the calibration (i.e., the translation from real-world space to virtual reality space).

Any particular type of WC fits into the arm 173 of the T/S 170 in the same repeatable way to within very tight tolerances. Therefore, once a particular WC type is calibrated, that WC type does not have to be re-calibrated (i.e., calibration of a particular type of WC is a one-time event). WCs of the same type are interchangeable. Calibration ensures that physical feedback perceived by the user during a welding process matches up with what is displayed to the user in virtual reality space, making the simulation seem more real. For example, if the user slides the tip of a MWT 160 around the corner of an actual WC 180, the user will see the tip sliding around the corner of the virtual WC on the FMDD 140 as the user feels the tip sliding around the actual corner. In accordance with an embodiment of the present invention, the MWT 160 is placed in a pre-positioned jig and is calibrated as well, based on the known jig position.

In accordance with an alternative embodiment of the present invention, "smart" coupons are provided, having sensors on, for example, the corners of the coupons. The ST 120 is able to track the corners of a "smart" coupon such that the system 100 continuously knows where the "smart" coupon is in real-world 3D space. In accordance with a further alternative embodiment of the present invention, licensing keys are provided to "unlock" welding coupons. When a particular WC is purchased, a licensing key is provided allowing the user to enter the licensing key into the system 100, unlocking the software associated with that WC. In accordance with another embodiment of the present invention, special non-standard welding coupons may be provided based on real-world CAD drawings of parts. Users may be able to train on welding a CAD part even before the part is actually produced in the real world.

Sound content functionality 1204 and welding sounds 1205 provide particular types of welding sounds that change depending on if certain welding parameters are within tolerance or out of tolerance. Sounds are tailored to the various welding processes and parameters. For example, in a MIG spray arc welding process, a crackling sound is provided when the user does not have the MWT 160 positioned correctly, and a hissing sound is provided when the MWT 160 is positioned correctly. In a short arc welding process, a steady crackling or frying sound is provided for proper welding technique, and a hissing sound may be provided when undercutting is occurring. These sounds mimic real-world sounds corresponding to correct and incorrect welding technique.

High fidelity sound content may be taken from real-world recordings of actual welding using a variety of electronic and mechanical means, in accordance with various embodiments of the present invention. In accordance with an embodiment of the present invention, the perceived volume and directionality of sound is modified depending on the position, orientation, and distance of the user's head (assuming the user is wearing a FMDD 140 that is tracked by the ST 120) with respect to the simulated arc between the MWT 160 and the WC 180. Sound may be provided to the user via ear bud speakers 910 in the FMDD 140 or via speakers configured in the console 135 or T/S 170, for example.

Environment models 1203 are provided to provide various background scenes (still and moving) in virtual reality space. Such background environments may include, for example, an indoor welding shop, an outdoor race track, a garage, etc. and may include moving cars, people, birds, clouds, and various environmental sounds. The background environment may be interactive, in accordance with an embodiment of the present invention. For example, a user may have to survey a background area, before starting welding, to ensure that the environment is appropriate (e.g., safe) for welding. Torch and clamp models 1202 are provided which model various MWTs 160 including, for example, guns, holders with stick electrodes, etc. in virtual reality space.

Coupon models 1210 are provided which model various WCs 180 including, for example, flat plate coupons, T-joint coupons, butt-joint coupons, groove-weld coupons, and pipe coupons (e.g., 2-inch diameter pipe and 6-inch diameter pipe) in virtual reality space. A stand/table model 1206 is provided which models the various parts of the T/S 170 including an adjustable table 171, a stand 172, an adjustable arm 173, and a vertical post 174 in virtual reality space. A physical interface model 1201 is provided which models the various parts of the welding user interface 130, console 135, and ODD 150 in virtual reality space.

In accordance with an embodiment of the present invention, simulation of a weld puddle or pool in virtual reality space is accomplished where the simulated weld puddle has real-time molten metal fluidity and heat dissipation characteristics. At the heart of the weld puddle simulation is the welding physics functionality 1211 (a.k.a., the physics model) which is run on the GPUs 115, in accordance with an embodiment of the present invention. The welding physics functionality employs a double displacement layer technique to accurately model dynamic fluidity/viscosity, solidity, heat gradient (heat absorption and dissipation), puddle wake, and bead shape.

The welding physics functionality 1211 communicates with the bead rendering functionality 1217 to render a weld bead in all states from the heated molten state to the cooled solidified state. The bead rendering functionality 1217 uses information from the welding physics functionality 1211 (e.g., heat, fluidity, displacement, dime spacing) to accurately and realistically render a weld bead in virtual reality space in real-time. The 3D textures functionality 1218 provides texture maps to the bead rendering functionality 1217 to overlay additional textures (e.g., scorching, slag, grain) onto the simulated weld bead. For example, slag may be shown rendered over a weld bead during and just after a welding process, and then removed to reveal the underlying weld bead. The renderer functionality 1216 is used to render various non-puddle specific characteristics using information from the special effects module 1222 including sparks, spatter, smoke, arc glow, fumes and gases, and certain discontinuities such as, for example, undercut and porosity.

The internal physics adjustment tool 1212 is a tweaking tool that allows various welding physics parameters to be defined, updated, and modified for the various welding processes. In accordance with an embodiment of the present invention, the internal physics adjustment tool 1212 runs on the CPU 111 and the adjusted or updated parameters are downloaded to the GPUs 115. The types of parameters that may be adjusted via the internal physics adjustment tool 1212 include parameters related to welding coupons, process parameters that allow a process to be changed without having to reset a welding coupon (allows for doing a second pass), various global parameters that can be changed without resetting the entire simulation, and other various parameters.

Figure 13:
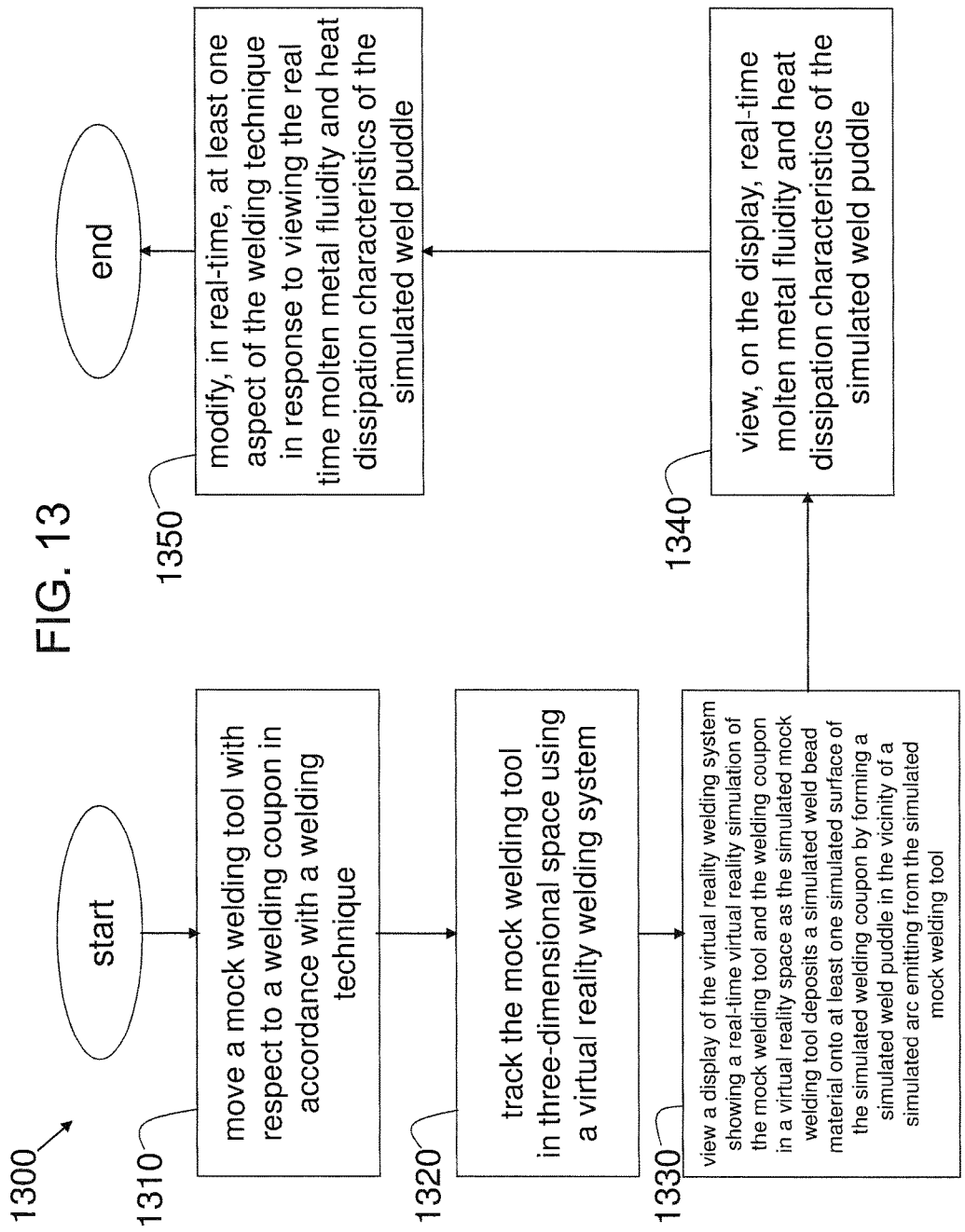
FIG. 13 is a flow chart of an embodiment of a method of training using the virtual reality training system of FIG. 1.

FIG. 13 is a flow chart of an embodiment of a method 1300 of training using the virtual reality training system 100 of FIG. 1. In step 1310, move a mock welding tool with respect to a welding coupon in accordance with a welding technique. In step 1320, track position and orientation of the mock welding tool in three-dimensional space using a virtual reality system. In step 1330, view a display of the virtual reality welding system showing a real-time virtual reality simulation of the mock welding tool and the welding coupon in a virtual reality space as the simulated mock welding tool deposits a simulated weld bead material onto at least one simulated surface of the simulated welding coupon by forming a simulated weld puddle in the vicinity of a simulated arc emitting from said simulated mock welding tool. In step 1340, view on the display, real-time molten metal fluidity and heat dissipation characteristics of the simulated weld puddle. In step 1350, modify in real-time, at least one aspect of the welding technique in response to viewing the real-time molten metal fluidity and heat dissipation characteristics of the simulated weld puddle.

The method 1300 illustrates how a user is able to view a weld puddle in virtual reality space and modify his welding technique in response to viewing various characteristics of the simulated weld puddle, including real-time molten metal fluidity (e.g., viscosity) and heat dissipation. The user may also view and respond to other characteristics including real-time puddle wake and dime spacing. Viewing and responding to characteristics of the weld puddle is how most welding operations are actually performed in the real world. The double displacement layer modeling of the welding physics functionality 1211 run on the GPUs 115 allows for such real-time molten metal fluidity and heat dissipation characteristics to be accurately modeled and represented to the user. For example, heat dissipation determines solidification time (i.e., how much time it takes for a wexel to completely solidify).

Furthermore, a user may make a second pass over the weld bead material using the same or a different (e.g., a second) mock welding tool and/or welding process. In such a second pass scenario, the simulation shows the simulated mock welding tool, the welding coupon, and the original simulated weld bead material in virtual reality space as the simulated mock welding tool deposits a second simulated weld bead material merging with the first simulated weld bead material by forming a second simulated weld puddle in the vicinity of a simulated arc emitting from the simulated mock welding tool. Additional subsequent passes using the same or different welding tools or processes may be made in a similar manner. In any second or subsequent pass, the previous weld bead material is merged with the new weld bead material being deposited as a new weld puddle is formed in virtual reality space from the combination of any of the previous weld bead material, the new weld bead material, and possibly the underlying coupon material in accordance with certain embodiments of the present invention. Such subsequent passes may be needed to make a large fillet or groove weld, performed to repair a weld bead formed by a previous pass, for example, or may include a hot pass and one or more fill and cap passes after a root pass as is done in pipe welding. In accordance with various embodiments of the present invention, weld bead and base material may include mild steel, stainless steel, aluminum, nickel based alloys, or other materials. Again, various types of student training data such as, for example, parameter data and scoring data may be stored on the VRAW system and may be used later with respect to a learning management system (LMS) as described later herein. Other types of student training data may be stored as well such as, for example, student identifying data.

Learning Management System (LMS)

As described above herein, a welding student may train on a virtual reality welding system for various types of welding processes and coupons, and student training data associated with that training may be generated and stored on the virtual reality welding system. A significant amount of data can be generated during a virtual reality welding training session (virtual welding process) for a student welder. A welding instructor, having multiple students in multiple classes at different levels of training, can find it very challenging to keep track of a student's progress and formulate relevant feedback for that student. Therefore, it is desirable to provide systems and methods to help welding instructors and students manage the data associated with instruction and learning in a virtual reality welding environment.

Types of welding processes that a student may perform on a virtual reality welding system may include, for example, a shielded metal arc welding process, a gas metal arc welding process, a flux-cored arc welding process, and a gas tungsten arc welding process. Types of welding skills that a user may acquire using a virtual reality welding system may include, for example, how to set up a system for a particular welding process, how to prepare metal for welding, how to properly hold a welding gun/torch during a particular welding process, how to strike an arc at the start of a particular welding process, how to move the welding electrode during a particular welding process, various plate welding skills, and various pipe welding skills. Other types of welding processes and skills are possible as well, in accordance with other various embodiments.

In accordance with an embodiment, a learning management system (LMS) is provided for tracking student progress as students learn how to weld in a real-time, simulated, virtual reality welding training environment. The LMS provides for the gathering of student training data from one or more virtual reality arc welding systems, storing the student training data in a centralized database in an organized manner, and allowing welding instructors and/or welding students to access at least a portion of the student training data for one or more of viewing, analysis, grading, and reporting. The LMS may also provide instructional welding lessons and materials to aid welding instructors and welding students.

Figure 14:
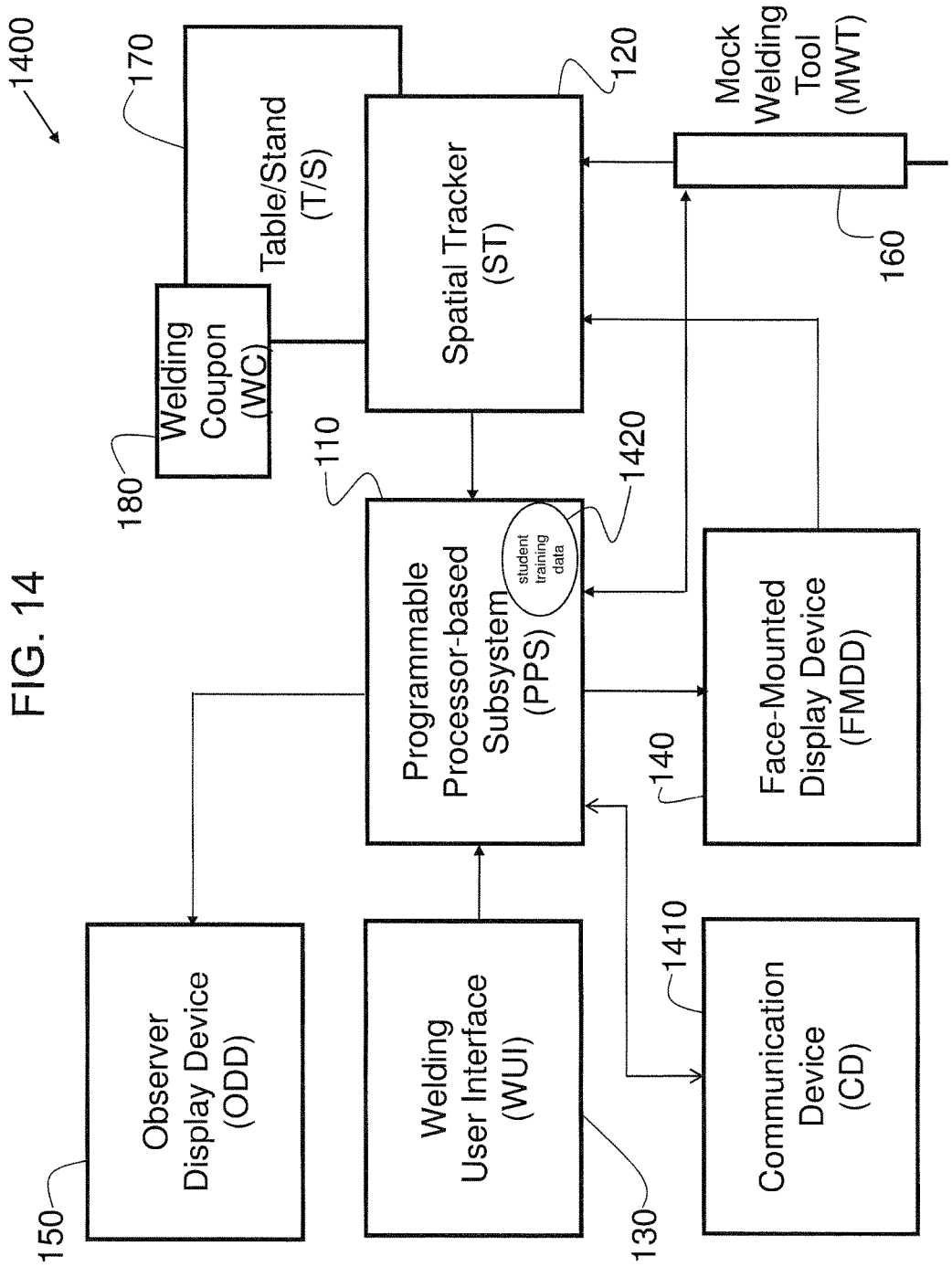
FIG. 14 illustrates an embodiment of a virtual reality welding system.

FIG. 14 illustrates an embodiment of a virtual reality welding system 1400. The virtual reality welding system 1400 is similar to the system 100 of FIG. 1 and is configured to generate one or more electronic files 1420 of student training data. In accordance with an embodiment, the PPS 110 tracks the student's virtual reality welding progress on the virtual reality welding system 1400 and generates the electronic file 1420 of student training data representative of the student's progress. For example, the student training data may include information related to parameters such as contact tip to work distance, weld angle, travel angle, and travel speed as affected by the welding student during a virtual welding process. The student training data may also include a score based on how close the parameters were to being within certain tolerances or meeting certain criteria as defined by a welding procedure specification (WPS) loaded onto the virtual reality welding system. The electronic file 1420 may be an Excel (.xls) file or a comma-separated values (.csv) file, for example.

In accordance with an embodiment, student training data for a student may also include a welding student name, a date and time of a virtual welding process performed by the welding student, default tolerances used during a virtual welding process, technique parameter scores based on a welding procedure specification (WPS), a welding pass number and a weld score per pass, an average of weld score passes, an overall score, a welding process and technique used, a joint configuration and position, discontinuities and percent, number of welds completed per joint configuration, data for return-on-investment reporting, student arc time, student material usage, student simulator time, and results of any virtual reality destructive testing (e.g., bend testing).

In accordance with an embodiment, the virtual reality welding system 1400 includes a communication device 1410 that is used to transmit student training data to some other external destination. The communication device 1410 is operatively connected to the programmable processor-based subsystem 110 of the virtual reality welding system 1400 and provides all of the circuitry and software for externally transmitting data in a digitally communicated manner. For example, the communication device 1410 may be a modem device providing wired or wireless connection to the internet. In other embodiments, the communication device may be WiFi communication circuitry and software, 3G or 4G communication circuitry and software, or universal serial bus (USB) circuitry and software, for example. Other types of communication devices are possible as well, in accordance with still other embodiments.

Figure 15:
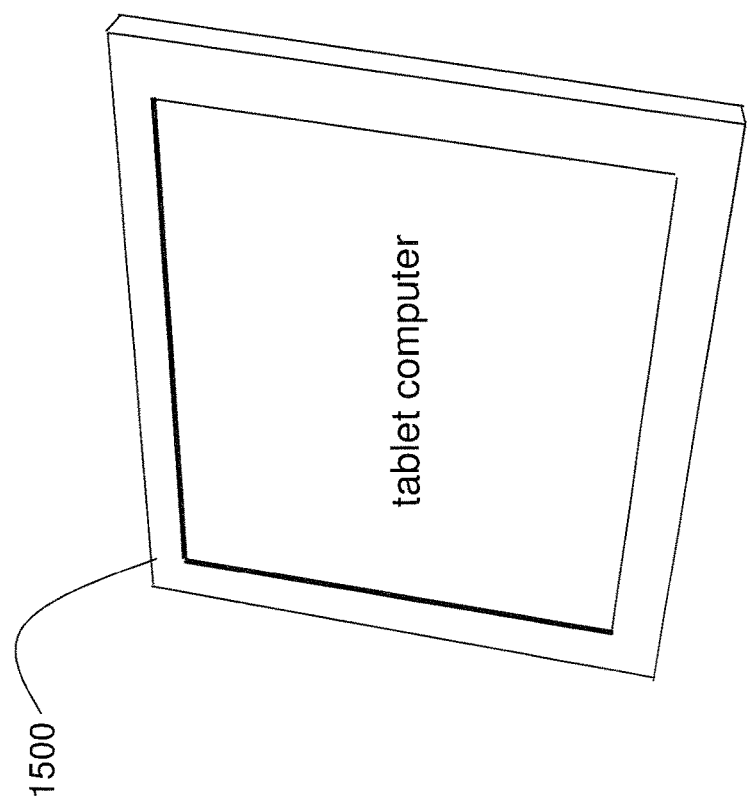
FIG. 15 illustrates an embodiment of a personal computer being a tablet device.

FIG. 15 illustrates an embodiment of a personal computer configured as a tablet device 1500. The tablet device 1500 may be used by a welding instructor or a welding student to access student training data for one or more of viewing, analyzing, grading, and reporting. The tablet device 1500 includes a display, wireless and/or wired communication means, and computer memory storing at least a learning management software application (LMSA). The tablet device 1500 also includes processing means operable to execute coded instructions of the LMSA.

Figure 16:
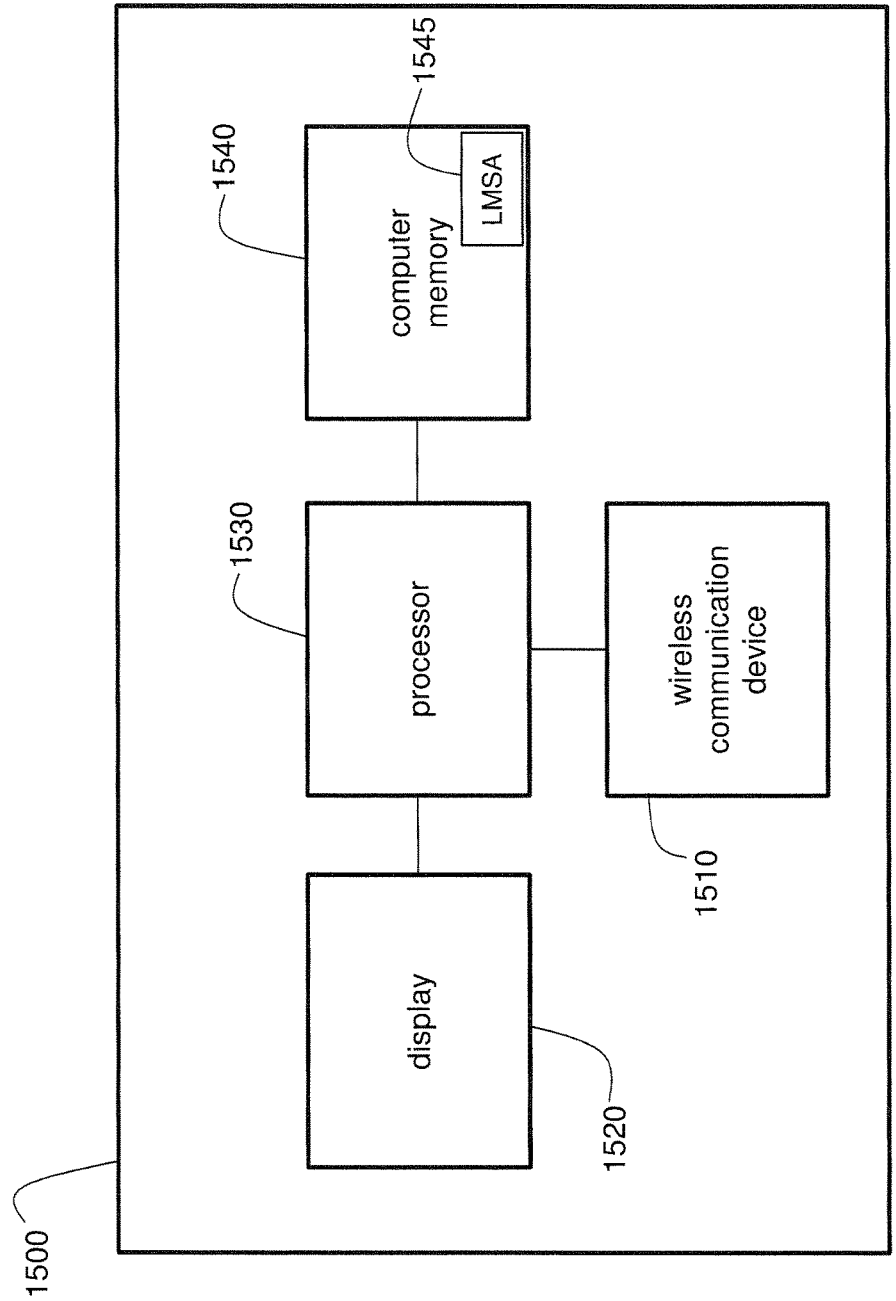
FIG. 16 illustrates a schematic block diagram of an example embodiment of the tablet device of FIG. 15.

FIG. 16 illustrates a schematic block diagram of an example embodiment of the tablet device 1500 of FIG. 15. The tablet device 1500 includes a wireless communication device 1510. The wireless communication device may include, for example, WiFi communication circuitry and software and/or 3G or 4G communication circuitry and software providing access to the VRAW system 1400 and/or an external communication infrastructure (e.g., the internet). The tablet device 1500 also includes a display 1520, a processor 1530, and computer memory 1540. The display 1520 may be a touch-screen display, in accordance with an embodiment. The processor 1530 may be a programmable microprocessor, for example, although other types of logic processors are possible as well. The computer memory 1540 may be, for example, electronic memory, such as a combination of random access memory (RAM) and read-only memory (ROM). Other types of computer memory may be possible as well, in accordance with various other embodiments.

The computer memory 1540 stores at least a learning management software application (LMSA) 1545 having coded instructions that may be executed on the processor 1530 to track welding student progress and to help welding instructors and students manage the data associated with instruction and learning in a virtual reality welding environment. In accordance with an embodiment, the virtual reality welding system 1400 may be accessed via the wireless communication device 1510 to retrieve student training data stored on the virtual reality welding system 1400. The student training data may be stored on the virtual reality welding system 1400 in the form of one or more electronic files, for example. As a welding student (user) practices on the virtual reality welding system 1400, the system 1400 records student training data. The student training data may include, for example, student-identifying data, information identifying the types of welding processes the student has performed on the virtual reality welding system 1400, and information related to a performance of the user for each of the welding processes.

Figure 17:
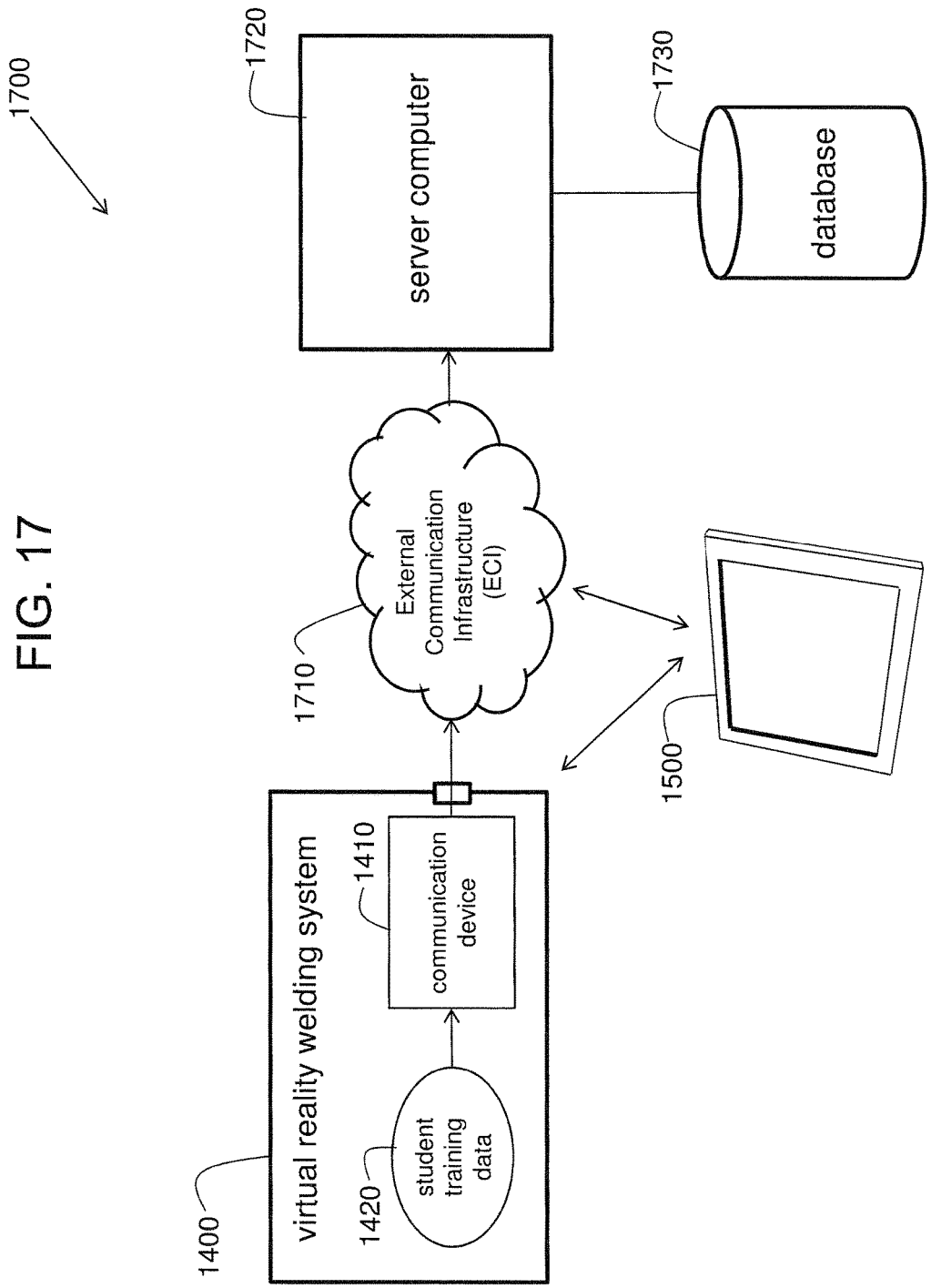
FIG. 17 illustrates a schematic block diagram of an embodiment of a learning management system (LMS)

FIG. 17 illustrates a schematic block diagram of an embodiment of a learning management system (LMS) 1700. The LMS 1700 includes a virtual reality welding system 1400, a personal computer (e.g., a tablet device) 1500 having a LMSA 1545, an external communication infrastructure (ECI) 1710, a server computer 1720, and a database 1730. The server computer 1720 and the database 1730 constitute a database server system. The external communication infrastructure 1710 may include one or more of the internet, a cellular telephone communication network, a WiFi communication network, or a satellite communication network, for example. Other types of external communication infrastructure may be possible as well, in accordance with various other embodiments. The server computer 1720 and the database 1730 may be located "in the cloud," in accordance with an embodiment. In other embodiments, the server computer and the database may be local (e.g., in proximity to the virtual reality welding system) and the ECI may instead be a local area network (LAN).

Student training data 1420 is generated and stored on the virtual reality welding system 1400 during a virtual welding training process. In accordance with an embodiment, the PPS 110 provides the computer memory for storing the student training data 1420. Again, the student training data 1420 may include, for example, information identifying the types of welding processes the student has performed on the virtual reality welding system 1400 along with information related to a performance of the student for each of the welding processes.

In accordance with an embodiment, student training data may be downloaded from the virtual reality welding system 1400 to the tablet device 1500 in a wireless manner via communication device 1410 and wireless communication device 1510. In accordance with an alternate embodiment, the wireless communication device 1510 may be a wired communication device (e.g., a USB device) and student training data may be downloaded from the virtual reality welding system 1400 to the tablet device 1500 in a wired manner via communication devices 1410 and 1510. In still another embodiment, student training data may be copied to a computer disk or a computer flash drive from the virtual reality welding system and transferred to the personal computer 1500 from the disk or the flash drive. In such an embodiment, the virtual reality welding system and the personal computer include a disk drive or a flash drive port.

The LMSA 1545 on the tablet device 1500 may be used by a welding instructor to view and analyze the student training data, to grade the student, and to generate reports (e.g., a student report card). Traceable reports may be generated that compare the performance of students to each other, or compare the performance of classes to each other, or compare the performance of this year's students to last year's students, for example. The LMSA provides analysis tools that determine how students are performing and identify any skills that a student is having trouble mastering. The LMSA summarizes student performance in the form of tables, charts, and graphs that are easily readable and understandable. An instructor can meet with an individual student and review the student's performance by viewing the various tables, charts, and graphs, on the display of the tablet device, that summarize the student's performance.

The transfer of data between a virtual reality welding system, a tablet device, and a server computer may be accomplished in various ways. In accordance with an embodiment, a welding instructor may upload raw student training data, analysis results, and reports from the tablet device 1500 to the server computer 1720, via the ECI 1710, to be stored in the database 1730. In accordance with an embodiment, student training data may be automatically uploaded from the virtual reality welding system 1400 to the server computer 1720, via the ECI 1710, to be stored in the database 1730. In accordance with an embodiment, student training data may be downloaded from the database 1730 to the tablet device 1500 via the server computer 1720 and the ECI 1710. For example, a welding instructor may download student training data for all of the students in a class, or for two or more classes, analyze the data, and make comparisons.

In accordance with an embodiment, the LMSA 1545 running on the tablet device 1500 generates a summary report of student virtual welding progress at the command of the welding instructor. The summary report of student virtual welding progress may include, for example, average performance information, or consolidated performance information for a student of the virtual reality welding system 1400. For example, an average pitch angle of how the student held a mock welding tool of the virtual reality welding system 1400 during a particular virtual welding process may be generated by the LMSA 1545 and displayed as part of the summary report. Furthermore, a consolidated presentation of pitch angle vs. roll angle of how a user held the mock welding tool during a particular virtual welding process may be generated by the LMSA 1545 and displayed as part of the summary report.

The summary report of student virtual welding progress may also include graphical information showing how a performance parameter associated with a student has changed (e.g., improved) over time. For example, a graph of the average travel speed of a mock welding tool over a plurality of successive welding activities performed by a student for a particular welding process may be generated by the LMSA 1545 and displayed as part of the summary report. The graph may indicate how the average travel speed started out varying between too fast and too slow and then eventually settled to a desired travel speed during the course of, for example, twenty (20) successive welding activities for a particular welding process, thus providing an indication of how long it took for the student to settle into applying the correct travel speed to the mock welding tool of the virtual reality welding system 1400.

Student training data may be accessed for a single student, or for a plurality of students, associated with one or more virtual reality welding systems, in accordance with an embodiment. For example, a welding instructor, using the tablet device 1500, may access student training data for all of his welding students across a plurality of virtual reality welding systems 1400 from the database 1730. The LMSA 1545 on the tablet device 1500 may create a summary report for each welding student and may also create a consolidated summary report which shows progress for all of the welding students, for example, in a comparative manner (e.g., a ranking of the welding students in a class).

FIG. 18 illustrates an embodiment of a screen shot of an instructor home page of the LMSA. A welding instructor can log in to view information related to the various students and classes for which the instructor is responsible. From the instructor home page, the instructor can navigate to perform various functions, including downloading and uploading data, as described herein. The instructor can also view lesson plans and make updates to those lesson plans as desired.

In accordance with an embodiment, the LMSA provides an easy set up wizard that provides personalized reporting, inputting of number of classes and class names, inputting of cost information of materials for return-on-investment calculations, diagnostic tools, confirmation of data downloaded, and the ability to backup data. Reports may be uploaded to a database or emailed to other instructors or students, for example.

Other functions provided by the LMSA include the ability to select graded joint configurations from a list to create a grade book for a class, the ability to enter other projects/assignments, that are not streamed or derived directly from a virtual reality welding system, for data manipulation (e.g., lab work scores, pre-classroom training, other assignments), applying pricing to data to determine cost savings, organizing student data by class/period/shift, measuring student improvement between two exercises or points in time, averaging student improvement across a group, generating pass/fail indications based on a cutoff score input by the instructor, generating a student information summary, the ability to add performance comments to a report for a welding student, performing analysis by category (analysis: average score, high score, low score, rank; category: all, joint configuration, process, class, data range, pass), the ability to define and enter a grading scale, the ability to generate a report card and select items to be included or excluded from the report card, the ability to generate printable reports (by student—report card generator, by class, by time frame; include area for comments/summary written by instructor), the ability to track student attendance, performing analysis of performance variables (including graphs/charts), the ability to archive final class results to a database server system, the creation and tracking of virtual certifications as acquired by welding students performing to determined levels on different welding exercises (e.g., passing root and face bend tests on 6" Sch 40 pipe in the 2 G position).

Figure 19:
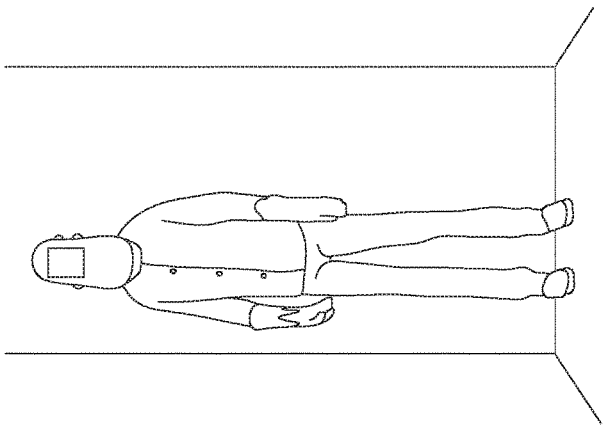
FIG. 19 illustrates an embodiment of a screen shot of a student home page of a learning management software application (LMSA).

FIG. 19 illustrates an embodiment of a screen shot of a student home page of the LMSA. A welding student can log in to view information related to the student's lessons and performance. From the student home page, the welding student can navigate to perform various functions, including uploading student data, contacting the instructor, and reviewing lessons and performance.

In accordance with an embodiment, real-world welding data (generated on a real-world welding machine) may be downloaded to the tablet device 1500 along with student training data (generated on a virtual reality welding system) by a same student. The LMSA 1545 may be used to perform a comparison analysis of the real-world welding data and the student training data for the student to determine the student's progress in transitioning from a virtual welding environment to a real-world welding environment. The real-world welding data is matched to the corresponding student training data and compared. In this manner, a student's progress through a welding school can be tracked and evaluated, from virtual welding through real-world welding.

In summary, a learning management system for tracking student progress as students learn how to weld in a real-time, simulated, virtual reality welding training environment is provided. Systems and methods to help welding instructors and students manage the data associated with instruction and learning in a virtual reality welding environment are provided. Welding student training data generated by students while using virtual reality welding systems is stored in a centralized database of the system. The centralized database is accessible by a user (e.g., a welding instructor) using a personal computer having a learning management software application (LMSA) installed thereon. The LMSA is configured to allow the user to access at least a portion of the student training data for one or more of viewing, analysis, grading, and reporting.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those of skill in the art.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
providing a virtual reality welding system comprising a mock welding tool and a welding coupon, the virtual reality welding system configured to generate student training data in response to a student performing a virtual welding process on the welding coupon using the mock welding tool;
storing the student training data on a database server system;
accessing the database server system using a personal computer having a learning management software application (LMSA) installed thereon, the LMSA comprising executable instructions configured to execute on the personal computer to perform each of:
downloading the student training data from the virtual reality welding system to the personal computer in at least one of a wired and wireless manner,
uploading the student training data from the personal computer to the database server system using an external communication infrastructure, and
downloading the student training data from the database server system to the personal computer using the external communication infrastructure;
wherein the student training data includes information related to results of virtual reality destructive testing.

2. The method of claim 1, further comprising using the LMSA to select graded joint configurations from a list to create a grade book for a class.

3. The method of claim 1, further comprising using the LMSA to enter welding projects and assignments, that are not derived directly from the virtual reality welding system, for data manipulation.

4. The method of claim 1, further comprising using the LMSA to apply pricing to the student training data to determine a cost savings.

5. The method of claim 1, further comprising using the LMSA to organize training data for a plurality of students by one or more of class, period, or shift.

6. The method of claim 1, further comprising using the LMSA to measure improvement by the student between two welding exercises or points in time.

7. The method of claim 1, further comprising using the LMSA to generate pass/fail indications based on a cutoff score input by a welding instructor.

8. The method of claim 1, further comprising using the LMSA to add performance comments to a report for the student.

9. The method of claim 1, further comprising using the LMSA to generate a report card and select items to be included or excluded from the report card for the student.

10. The method of claim 1, further comprising using the LMSA to generate printable reports by one or more of a welding student, a welding class, or a time frame.

11. The method of claim 1, further comprising using the LMSA to archive final welding class results to the database server system.

12. The method of claim 1, further comprising using the LMSA to create and track virtual certifications as acquired by the student performing to determined levels on welding exercises.

13. The method of claim 1, further comprising:
using the LMSA to enter real-world welding data generated during a real-world welding process performed by the student using a real-world welding machine; and
using the LMSA to compare the real-world welding data to at least a portion of the student training data associated with the student.

* * * * *